United States Patent
Young et al.

(10) Patent No.: US 11,124,162 B2
(45) Date of Patent: Sep. 21, 2021

(54) SYSTEM AND METHOD FOR CLEANING AND SANITIZING THE INTERIOR OF A FREIGHT CONTAINER

(71) Applicant: Healthy Trailer, LLC, Salinas, CA (US)

(72) Inventors: Pamela Lugg Young, Greenfield, CA (US); Michael E. Ray, Salinas, CA (US); Lora Eade, Paso Robles, CA (US); James R. Lugg, Salinas, CA (US); Alvin Trentelman, Salinas, CA (US); David Philip Robinson, Salinas, CA (US)

(73) Assignee: HEALTHY TRAILER, LLC, Salinas, CA (US)

( * ) Notice: Subject to any disclaimer, the term of this patent is extended or adjusted under 35 U.S.C. 154(b) by 386 days.

(21) Appl. No.: 16/039,308

(22) Filed: Jul. 18, 2018

(65) Prior Publication Data
US 2019/0023234 A1    Jan. 24, 2019

Related U.S. Application Data

(60) Provisional application No. 62/534,626, filed on Jul. 19, 2017.

(51) Int. Cl.
*B60S 3/00* (2006.01)
*B08B 3/02* (2006.01)
*B08B 9/093* (2006.01)

(52) U.S. Cl.
CPC .............. *B60S 3/008* (2013.01); *B08B 3/024* (2013.01); *B08B 9/093* (2013.01); *B08B 2209/08* (2013.01)

(58) Field of Classification Search
None
See application file for complete search history.

(56) References Cited

U.S. PATENT DOCUMENTS

| | | | | |
|---|---|---|---|---|
| 3,534,746 A | * | 10/1970 | Posner | B60S 3/008 134/46 |
| 4,112,533 A | * | 9/1978 | Brager | B60S 3/06 15/53.2 |

(Continued)

FOREIGN PATENT DOCUMENTS

| DE | 102012024887 B4 | 3/2016 |
|---|---|---|
| EP | 1 166 903 A2 | 1/2002 |

(Continued)

OTHER PUBLICATIONS

International Search Report dated Oct. 16, 2018 for corresponding International Patent Application PCT/US2018/042923, 2 pages.

(Continued)

*Primary Examiner* — Cristi J Tate-Sims
(74) *Attorney, Agent, or Firm* — Kilpatrick Townsend & Stockton LLP

(57) ABSTRACT

An automated wash rig is disclosed for cleaning the interior of a freight container. The wash rig may be transported atop a mobile platform or carriage and inserted into the interior of the freight container. During the cleaning process, the wash rig may travel along the length of the floor of the freight container. Washers (e.g., spray nozzles) on the wash rig may be used to direct cleaning fluid at the surfaces of the interior of the freight container, while dryers (e.g., air knives) on the wash rig may be used to dry off those surfaces. As the wash rig traverses the entire length of the freight container, the entire interior of the freight container is washed and dried. The wash rig may also have ultraviolet (UV) lamps which can provide UV light to sanitize the interior of the freight container during this process.

21 Claims, 14 Drawing Sheets

(56) References Cited

U.S. PATENT DOCUMENTS

| | | | |
|---|---|---|---|
| 4,240,175 A | 12/1980 | Rogers | |
| 4,784,166 A | 11/1988 | Brager et al. | |
| 6,279,589 B1 * | 8/2001 | Goodley | B08B 9/0936 |
| | | | 134/102.1 |
| 6,837,166 B1 | 1/2005 | Roodenburg et al. | |
| 2009/0050174 A1 * | 2/2009 | Gheparde | B08B 7/0071 |
| | | | 134/1 |
| 2012/0048315 A1 * | 3/2012 | Rollins | B60S 3/04 |
| | | | 134/56 R |
| 2014/0241941 A1 | 8/2014 | Kreitenberg | |

FOREIGN PATENT DOCUMENTS

| | | | | |
|---|---|---|---|---|
| EP | 3069799 A1 * | 9/2016 | | B08B 9/0936 |
| WO | 2012/022881 A1 | 2/2012 | | |
| WO | 2016/146821 A1 | 9/2016 | | |

OTHER PUBLICATIONS

Written Opinion dated Oct. 16, 2018 for corresponding International Patent Application PCT/US2018/042923, 5 pages.
Written Opinion and State-of-the-Art search report dated May 29, 2020 for corresponding Spanish Patent Application No. 202090001, with English Translation, 14 pages.

\* cited by examiner

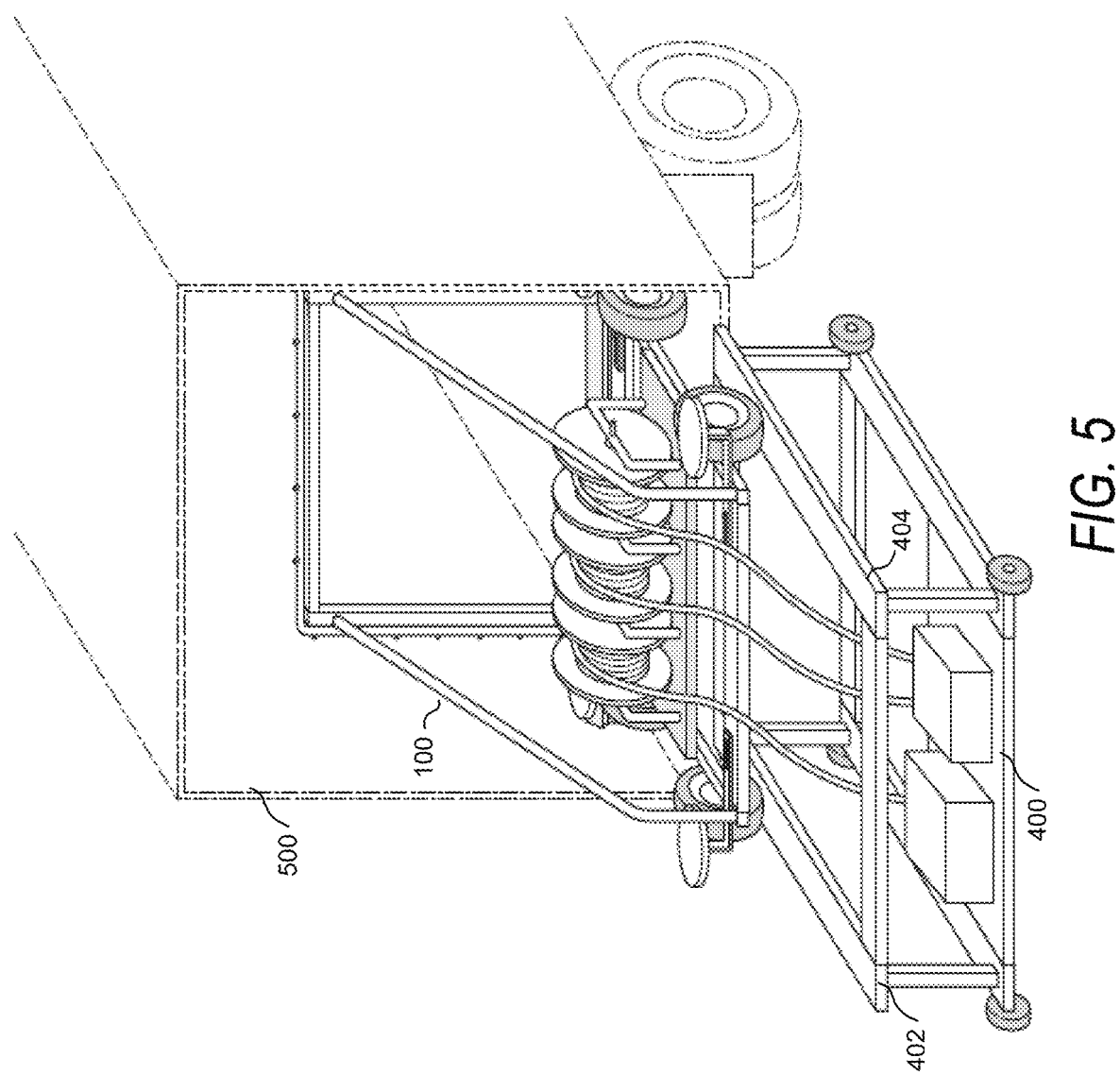

SYSTEM AND METHOD FOR CLEANING AND SANITIZING THE INTERIOR OF A FREIGHT CONTAINER

CROSS-REFERENCES TO RELATED APPLICATIONS

This application claims the benefit of U.S. Provisional Application No. 62,534,626 filed on Jul. 19, 2017, which is incorporated by reference herein.

BACKGROUND OF THE INVENTION

The present disclosure is directed to systems, methods, and devices for cleaning (e.g., washing and sanitizing) the interior of an elongate, generally rectangular freight container, such as a truck trailer, a railroad car, a cargo container, a refrigerated container, and so forth. These types of large freight containers are used in a wide variety of commercial enterprises and must be kept clean primarily for sanitation reasons. For example, truck trailers, railroad cars, and shipboard cargo containers used to transport perishable freight (e.g., meat and vegetables) must be regularly washed to remove debris and must be sanitized in order to prevent the spread of human pathogens from entering the food supply chain. Otherwise, transporting perishable freight with an unclean freight container is more likely to lead to the perishable freight becoming spoiled or contaminated, and therefore implicated in a food safety outbreak.

One way to clean the interior of these freight containers is to wash them manually. For instance, a person may use brooms, brushes, mops, hoses, and so forth, to scrub the interior surfaces of the freight container. However, manually washing the freight containers is an expensive and time-consuming process with a great deal of variability based on the person doing the washing. Thus, a manual approach makes it difficult for freight containers to be thoroughly cleaned on a consistent basis. This can be problematic because the Food and Drug Administration (FDA) has promulgated a Sanitary Transportation Rule, which sets forth requirements for carriers (e.g., parties engaged in the transportation of food) to provide a "clean and sanitized" trailer. The rule also mandates that the freight container be methodically and reliably sanitized, a requirement that is not met when manually cleaning freight containers. Thus, going forward, freight containers must be cleaned and sanitized in a manner that complies with these new rules.

Some devices have been created to automate the process of cleaning the interior of a freight container. For example, wash dollies have been created that have support wheels for allowing the dolly to move along the floor of the freight container. The dolly may have brushes to clean the floor and/or the side walls of the freight container as the dolly moves along the floor of the freight container. However, these brushes may not be adequate for reaching every surface in the interior of the freight container (e.g., the ceiling or the bulkhead), which means that the interior of the freight container will not be completely washed. Furthermore, brushes may not always be effective at cleaning and can actually spread debris or bacteria over the surfaces being washed.

BRIEF SUMMARY OF THE INVENTION

The present disclosure is directed to devices or automated wash rigs that are usable for the automated cleaning of the interior of a freight container without the use of brushes. These devices may utilize washers for cleaning the interior of the freight container and the washers may be oriented for cleaning every interior surface (e.g., including the ceiling and/or the bulkhead) of the freight containers. These devices may also have dryers that are usable for drying the interior of the freight container after washing in order to prevent the spread of debris and/or bacteria. These devices may also have integrated ultraviolet (UV) lamps for additional sanitation of the interior of the freight container, or the UV lamps may be used separately.

In some embodiments, these devices may be utilized as part of a system or method for cleaning and sanitizing the freight container. For instance, the device may be used during the washing process to clean and dry the surfaces of the interior of the freight container. Following this washing process, a biological materials test may be employed on the surfaces of the interior of the freight container to assess cleanliness. A separate ultraviolet (UV) sanitation rig, which is configured for providing UV light, can be employed and set within the freight container in order to provide sanitation. The entire system or method, when used together, may provide a high level of cleanliness for overcoming any standards associated with freight container cleanliness.

In some embodiments, a device (e.g., a wash rig) is contemplated that includes a wheeled chassis having a front and a rear. The wheeled chassis may be adapted to fit in an interior of a freight container, which may have a set of surfaces including a floor, a first wall (e.g., the left side wall), second wall (e.g., a right side wall), a ceiling, and a bulkhead (e.g., the wall opposing the opening of the freight container). For instance, the wheeled chassis may have a width that is narrow enough for it to fit between the side walls of the freight container.

The device may have one or more motors, which are configured to propel the chassis longitudinally back and forth along the floor of the freight container, such that the device can traverse the length of the freight container. There may be a frame mounted on the wheeled chassis, which may include a first vertical support having a first side dryer and a first set of washers, a second vertical support having a second side dryer and a second set of washers, and at least one horizontal support connecting the first vertical support and the second vertical support. The horizontal support may have a bottom dryer and a third set of washers.

The first side dryer may be directed towards the rear of the chassis and configured to direct air towards the rear of the chassis and to the first wall (e.g., the left side wall) of the freight container. The first set of washers may be directed towards the front of the chassis and to the first wall (e.g., the left side wall) of the freight container. The first set of washers may direct cleaning fluid to cover the first wall of the freight container as the device traverses the length of the freight container, while the first side dryer simultaneously directs air to drive any excess water on the first wall of the freight container towards the rear of the chassis.

The second side dryer may be directed towards the rear of the chassis and configured to direct air towards the rear of the chassis and to the second wall (e.g., the right side wall) of the freight container. The second set of washers may be directed towards the front of the chassis and to the second wall (e.g., the right side wall) of the freight container. The second set of washers may direct cleaning fluid to cover the second wall of the freight container as the device traverses the length of the freight container, while the second side dryer simultaneously directs air to drive any excess water on the second wall of the freight container towards the rear of the chassis.

The bottom dryer on the horizontal support may be directed towards the rear of the chassis and configured to direct air towards the rear of the chassis and to the floor of the freight container. The third set of washers may be directed towards the front of the chassis and to the floor of the freight container. Thus, the third set of washers may direct cleaning fluid to cover the floor of the freight container as the device traverses the length of the freight container, while the bottom dryer simultaneously directs air to drive any excess water on the floor of the freight container towards the rear of the chassis.

In varying embodiments, the first, second, and third sets of washers may be brushless. In some embodiments, the first, second, and third sets of washers are nozzles. In some embodiments, the first, second, and third set of washers are fixed nozzles. In some embodiments, the first, second, and third set of washers are non-rotating nozzles. In some embodiments, the first, second, and third set of washers are each configured to discharge a fluid at ambient temperature. In some embodiments, the first, second, and third set of washers are each configured to discharge a cleaning fluid, which may be a soap-less fluid (e.g., water).

In some embodiments, the first side dryer may be a first set of air knives, the second side dryer may be a second set of air knives, and the bottom dryer may be a third set of air knives. In some embodiments, the device may further include an air compressor and a water source. The air compressor may generate pressurized air that is carried to the dryers in order to produce the air flow needed to drive excess water off the surfaces of the interior of the freight container. The water source may supply cleaning fluid (e.g., water) to the first, second, and third set of washers.

In some embodiments, the device may have one or more air hoses for coupling the air compressor to the first side dryer, second side dryer, and bottom dryer, and compressed air from the air compressor may be transported by the air hoses. In some embodiments, the device may have one or more water hoses for coupling the water source to the first, second and third sets of washers, and cleaning fluid from the water source may be transported by the water hoses.

In some embodiments, the motor may be an electrical motor or a hydraulic motor. For the purposes of this disclosure, any operations of the rig described involving the hydraulic motor can be performed instead with an electrical motor powered by an electrical power source, but a hydraulic motor is primarily discussed as a uniform example for the purpose of facilitating understanding of this application. There may be one or more hydraulic hoses for transporting hydraulic fluid to the hydraulic motor for the purposes of propelling the device forward or backwards in the interior of the freight container. In some embodiments, the wheeled chassis may have four rubber wheels configured to contact the floor of the freight container. The wheeled chassis may also have a first set of guide wheels and a second set of guide wheels, and a spacing between the first set of guide wheels and the second set of guide wheels may be adjustable to allow the first set of guide wheels to contact the first wall and the second set of guide wheels to contact the second wall while the motor propels the chassis longitudinally back and forth along the floor of the freight container.

In some embodiments, the first, second, and third sets of washers may each be a plurality of nozzles. Each set of washers may include a set of nine nozzles arranged in a linear fashion with approximately equal spacing between each nozzle. For instance, the first set of washers may be a first set of nozzles positioned at equal intervals along a vertical line of the first vertical support. The second set of washers may be a second set of nozzles positioned at equal intervals along a vertical line of the second vertical support. The third set of washers may be a third set of nozzles positioned at equal intervals along a horizontal line of the horizontal support.

In some embodiments, the frame of the device may further include another horizontal support (e.g., a second horizontal support) that is positioned near the top of the frame. There may be washers or nozzles on this top horizontal support which are configured to direct cleaning fluid towards the front of the chassis and upwards towards the ceiling of the container. When the device is close enough to the bulkhead, cleaning fluid from these washers or nozzles may be directed to hit the bulkhead.

As previously mentioned, this device may be used as part of a system or process for cleaning and sanitizing the interior of freight containers. For instance, during the washing process, the device may be deployed into the interior of the freight container to wash and dry the surfaces of the interior of the freight container. The device may wash the surfaces by discharging a cleaning fluid (e.g., a soap-less fluid) onto each surface of the interior of the container. This fluid may be at a warm or ambient temperature. The discharging of the cleaning fluid may be done at high pressures and velocities to allow the device to wash the set of surfaces without needing a brush.

Afterwards, the device may be extracted from the interior of the freight container. The efficacy of the device may be determined by applying a test for biological materials (e.g., adenosine triphosphate detection testing) to the surfaces of the interior of the freight container to determine if the surfaces are sanitary or cleaned in accordance with a protocol. In some embodiments, the interior surfaces of the freight container may be evaluated for the presence or absence of human pathogens using adenosine triphosphate (ATP) test strips. Following this step, an ultraviolet (UV) sanitation rig can be deployed into the interior of the container and uses to sanitize the interior surfaces of the freight container by exposing them to UV light.

In some embodiments, the UV sanitation rig may include a first frame, a second frame, and a third frame, and each of the first, second, and third frames may be independently movable and capable of holding an independent set of UV lights. Deploying the UV sanitation rig may involve moving the third frame along the floor to position the third frame at a displacement of 175 inches from a center of the freight container, moving the second frame along the floor to position the second frame at the center of the freight container, and moving the first frame along the floor to position the first frame at a displacement of −175 inches from the center of the freight container. In some embodiments, deploying the UV sanitation rig into the interior of the container may involve moving the UV sanitation rig along the floor of the container towards the bulkhead.

Moving the frames of the UV sanitation rig into those exact positions may be advantageous for various reasons. For a freight container with considerable length, this deployment leaves the three frames spaced out rather evenly along the length of the freight container. This allows the simultaneous operation of the three frames (e.g., by turning on all of the UV lamps attached to the frames) to provide substantial UV light coverage over all of the interior surfaces of the freight container. Since the intensity of light decreases exponentially with increasing distance from the light source, this deployment allows all of the interior surfaces to receive sufficient light intensity for sanitation purposes. However, for especially lengthy freight containers, more frames can be used to ensure that the interior surfaces of the freight container are receiving enough light for sanitation purposes. Thus, the number of frames and their positioning within the freight container can be dependent on the length of the freight container; additional frames can be utilized, or the frames may be re-positioned, based on the length of the freight container.

In some embodiments, each frame of the UV sanitation rig may be independently movable and include a first vertical support, a second vertical support, and a third vertical support, with the second vertical support is positioned between the first vertical support and the third vertical support. There may be a first horizontal support orthogonally coupled to each of the first vertical support, the second vertical support, and the third vertical support, as well as a second horizontal support orthogonally coupled to each of the first vertical support, the second vertical support, and the third vertical support. The first horizontal support may be parallel to the second horizontal support. In some embodiments, a set of four caster wheels may be located at a bottom of the frame. There may also be a mounting structure configured for laterally mounting a series of ultraviolet (UV) lamps to the frame.

The features of automated wash rigs and ultraviolet (UV) sanitation rigs may be combined into a single device (e.g., a combined ultraviolet (UV) sanitation and wash rig) so that the interior of the freight container can be seamlessly cleaned, dried, and sanitized without having to swap between multiple devices. For instance, UV lights can be added to the automated wash rig and used during the cleaning and drying operations.

Furthermore, a mobile platform (e.g., carriage) and/or deck can be used with the automated rig, ultraviolet (UV) sanitation rig, or the combined ultraviolet (UV) sanitation and wash rig, in order to facilitate easier deployment into the interior of freight containers. Since freight containers will often have varying dimensions and elevations (e.g., when the freight container is attached to the back of a truck), the carriage and/or deck can be used to help align the rig with the entrance of the freight container and assist in moving the rig(s) into the freight container. The deck may also be used to house various support equipment used by the rig, such as an electrical power source, hydraulic fluid source, water source or cleaning fluid source, and so forth.

In some embodiments, the combined device may include a wheeled chassis having a front and a rear, with the wheeled chassis adapted to fit in an interior of a freight container. The interior of the freight container may include a set of surfaces including a floor, a first wall, second wall, a ceiling, and a bulkhead. The device may further include a motor configured to propel the chassis longitudinally back and forth along the floor of the freight container, and a frame mounted on the wheeled chassis. The frame may include a first vertical support having a first side dryer and a first set of washers, a second vertical support having a second side dryer and a second set of washers, and a first horizontal support connecting the first vertical support and the second vertical support, and a second horizontal support connecting the first vertical support and the second vertical support. The horizontal support may have a bottom dryer and a third set of washers, and the horizontal support may have a top dryer and a fourth set of washers.

In various embodiments, the first, second, third, and fourth sets of washers are brushless. In various embodiments, the first, second, third, and fourth sets of washers are spray nozzles. In various embodiments, the first, second, third, and fourth sets of washers each comprise an array of four spray nozzles disposed in a spray bar. In various embodiments, the first, second, third, and fourth set of washers are non-rotating nozzles. In various embodiments, the first, second, third, and fourth set of washers are each configured to discharge a fluid at ambient temperature. In various embodiments, the first, second, third, and fourth set of washers are each configured to discharge a soap-less fluid.

In various embodiments, the first side dryer includes a first set of air knives, the second side dryer includes a second set of air knives, the bottom dryer includes a third set of air knives, and the top dryer includes a fourth set of air knives. In various embodiments, the first, second, third, and fourth set of washers are fluidly coupled to a water source, and the first side dryer, second side dryer, bottom dryer, and top dryer are fluidly coupled to one or more air blowers. In various embodiments, the device further includes ducting for fluidly coupling the first side dryer, second side dryer, bottom dryer, and top dryer to the one or more air blowers, and a first water hose for fluidly coupling the water source to the first, second, third, and fourth set of washers. In various embodiments, the motor is a hydraulic motor. In various embodiments, the wheeled chassis comprises four rubber wheels configured to contact the floor of the freight container.

In various embodiments, the wheeled chassis further includes a first set of guide wheels and a second set of guide wheels. There may be a spacing between the first set of guide wheels and the second set of guide wheels that is adjustable to allow the first set of guide wheels to contact the first wall and the second set of guide wheels to contact the second wall while the motor propels the chassis longitudinally back and forth along the floor of the freight container. In various embodiments, the device further includes one or more ultraviolet (UV) light shrouds configured to emit UV light. In various embodiments, the one or more UV light shrouds includes two top UV light shrouds, two front UV light shrouds, and two side UV light shrouds.

In various embodiments, the device further includes a stop sensor bar extending towards the front of the wheeled chassis and configured to contact the bulkhead of the freight container as the motor propels the chassis longitudinally forward along the floor of the freight container. In various embodiments, the device is configured to move longitudinally backwards upon the stop sensor bar contacting the bulkhead of the freight container.

In some embodiments, a method is disclosed for sanitizing an interior of a freight container, that method including deploying an automated wash rig into the interior of the freight container having a set of surfaces including a floor, a first wall, second wall, a ceiling, and a bulkhead. The method may further include permitting the automated wash rig to wash the set of surfaces, permitting the automated wash rig to dry the set of surfaces, and extracting the automated wash rig from the interior of the freight container. In various embodiments, the automated wash rig may include a wheeled chassis having a front and a rear. The wheeled chassis may be adapted to fit in an interior of a freight container, the interior of the freight container including a set of surfaces including a floor, a first wall, second wall, a ceiling, and a bulkhead. In various embodiments, the automated wash rig may include a motor configured to propel the chassis longitudinally back and forth along the floor of the freight container and a frame mounted on the wheeled chassis. The frame may include a first vertical support having a first side dryer and a first set of washers, a second vertical support having a second side dryer and a second set of washers, a first horizontal support connecting the first vertical support and the second vertical support, with the horizontal support having a bottom dryer and a third set of washers, and a second horizontal support connecting the first vertical support and the second vertical support, with the horizontal support having a top dryer and a fourth set of washers. In various embodiments, the method may further include aligning a carriage holding the automated wash rig with the interior of the freight container prior to deploying the automated wash rig.

The disclosure will be readily understood by the following detailed description in conjunction with the accompanying drawings.

BRIEF DESCRIPTION OF THE DRAWINGS

FIG. 5 illustrates a perspective view of a wash rig with a mobile platform, in accordance with embodiments of the present disclosure.

DETAILED DESCRIPTION OF THE INVENTION

Introduction

The present disclosure includes a device, which may include an automated wash rig that can be transported by a mobile platform, that can be used to clean the interior surfaces of a freight container. The interior of the freight container may include a floor, a first wall (e.g., the left side wall), second wall (e.g., a right side wall), a ceiling, and a bulkhead (e.g., the wall opposing the opening of the freight container).

The mobile platform may be used to align the automated wash rig with the opening of the freight container. Initiating the washing process may involve the wash rig being propelled forward into the freight container. As the wash rig traverses the length of the freight container, the wash rig may have features or components that are used to wash and dry (e.g., to make the surface free of collected moisture) the surfaces of the interior of the freight container. For instance, the wash rig may wash the surfaces by discharging a cleaning fluid onto each surface of the interior of the container. The discharging of the cleaning fluid may be done at high pressures and velocities to allow the device to wash the set of surfaces without needing a brush. The wash rig may also have dryers for directing air flow at high pressures or velocities to push excess cleaning fluid towards the rear of the wash rig and towards the opening of the freight container.

As described herein, the term cleaning fluid may refer to any fluid or combination of fluids, solvent, or solution typically used in the process of cleaning surfaces. In some embodiments, the cleaning fluid may be water or any other soap-less fluid. In other embodiments, the cleaning fluid may refer to a cleaning solution (e.g., containing substances for removing oil, grease, or other contaminants) that can be safely applied to the interior surfaces of a freight container.

After the wash rig has traversed the entire length of the freight container during the washing process, the wash rig may be extracted from the interior of the freight container (e.g., by rolling backwards onto the mobile platform). The efficacy of the washing process may be determined by applying a test for biological materials (e.g., adenosine triphosphate detection testing) to the surfaces of the interior of the freight container to determine if the surfaces are sufficiently clean and sanitary. An ultraviolet (UV) sanitation rig can be deployed into the interior of the container and used to sanitize the surfaces of the interior by exposing them to UV light. This combination of steps will help ensure that any bacterial buildup on the surfaces of the interior of the freight container is removed, which will allow the freight container to be used to transport perishable freight without fear of contamination.

Figures

Figure 1:
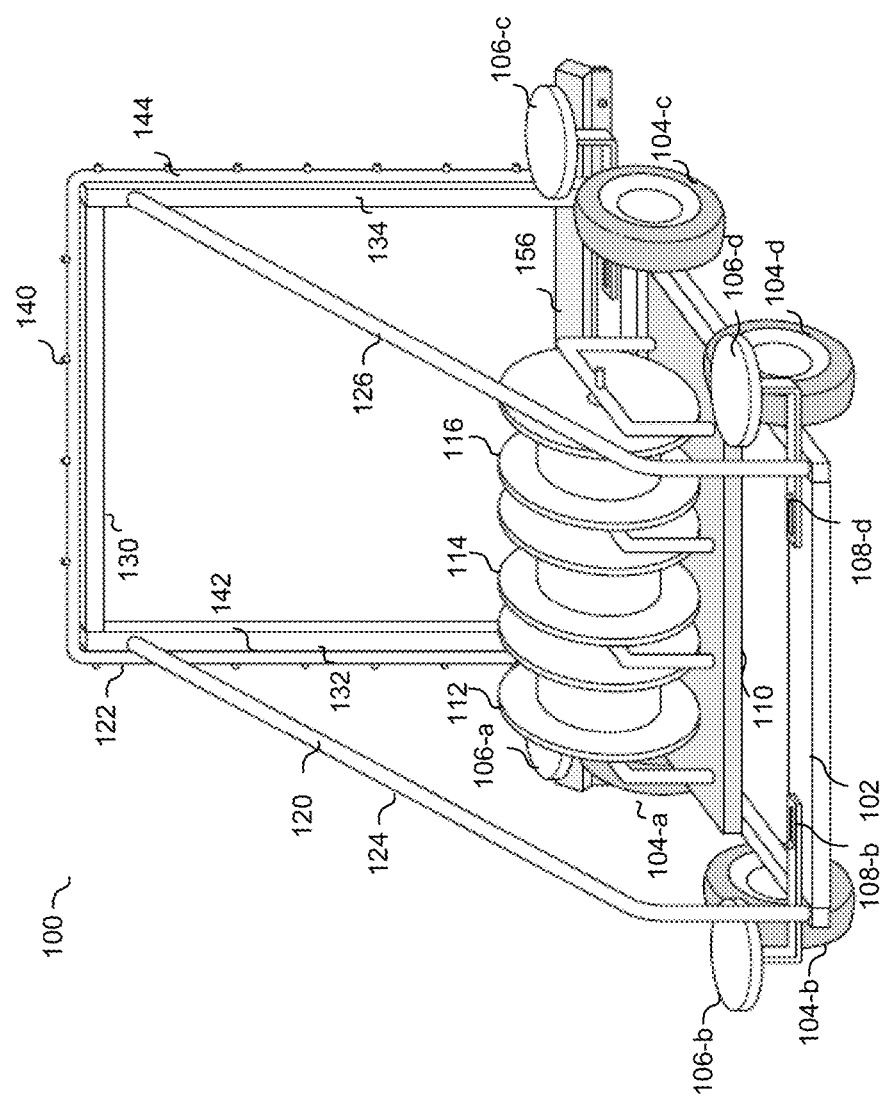
FIG. 1 illustrates a perspective view of a wash rig, in accordance with embodiments of the present disclosure.

FIG. 1 illustrates a perspective view of a wash rig 100, in accordance with embodiments of the present disclosure.

In some embodiments, the wash rig 100 may have a chassis 102. Attached to the chassis 102 may be a set of support wheels, such as the support wheels 104-*a*, 104-*b*, 104-*c*, and 104-*d* (collectively referred to as the support wheels 104). As shown in the figure, the support wheels 104 include four support wheels that are vertically-oriented (e.g., such that the wheels have a lateral or horizontal rotational axis), with two on each side of the chassis 102. However, in other embodiments, there may be any number of support wheels (e.g., six support wheels, eight support wheels, and so forth).

As shown in the figure, each of the support wheels 104 are independently mounted to the chassis 102. However, in other embodiments, the support wheels 104 may be mounted to axles attached to the chassis 102 (e.g., each pair of opposing support wheels may be connected by an axle, such as in a car).

In some embodiments, the support wheels 104 may be configured to provide the wash rig 100 at least bi-directional movement. For instance, each of the support wheels 104 may be able to spin around their rotational axis in order to allow the wash rig 100 to move forwards (e.g., further into a freight container) or backwards (e.g., retracting from the freight container). In some embodiments, the support wheels 104 may also be configured to allow the wash rig 100 to turn left and right as it is moving forwards or backwards (e.g., similar to how a car turns). For instance, the front pair of support wheels (e.g., support wheels 104-*a* and 104-*c*) may be able to turn left or right together in a coordinated fashion. In some of such embodiments, the front pair of support wheels may be connected by an axle that allows the wheels to turn together in a coordinated fashion. In some embodiments, some or all of the support wheels 104 may be on a fixed axle that allows those support wheels 104 to spin around their rotational axis in order to allow the wash rig 100 to move forwards or backwards, but the fixed axle may prevent the support wheels 104 from pivoting (e.g., to turn the wash rig 100 left or right).

In some embodiments, there may also be a set of guide wheels, such as the guide wheels 106-*a*, 106-*b*, 106-*c*, and 106-*d* (collectively referred to as the guide wheels 106), that are attached to the chassis 102. As shown in the figure, the guide wheels 106 include four guide wheels that are horizontally-oriented (e.g., such that the wheels have a vertical rotational axis), with two on each side of the chassis 102. However, in other embodiments, there may be any number of guide wheels (e.g., two guide wheels with one each side of the chassis 102, six support wheels, and so forth).

In some embodiments, the guide wheels 106 may be attached to the chassis 102 via arms. For instance, guide wheel 106-*a* may be coupled to arm 108-*a* (not shown), guide wheel 106-*b* may be coupled to arm 108-*b*, guide wheel 106-*c* may be coupled to arm 108-*c* (not shown), and arm 106-*d* may be coupled to arm 108-*d*. Collectively, arms 108-*a*, 108-*b*, 108-*c*, and 108-*d* may be referred to as the arms 108. The arms 108 may be mounted on the sides of the chassis 102 to support the guide wheels 106.

In some embodiments, the arms 108 may be attached to the chassis 102 in a manner that allows the arms 108 to slide outwards from the chassis 102 and/or inwards from the chassis 102, such that the distance of the guide wheels 106 from the chassis 102 can be adjusted. In other embodiments, each of the arms 108 may be attached to the chassis 102 at a pivot point and each arm may be rotatable around that pivot point in order to adjust the distance of the guide wheels 106 from the chassis 102. The adjustment of the distance from the chassis 102 of the guide wheels 106 may allow the guide wheels 106 to be positioned to engage the sides of a freight container as the wash rig 100 travels forwards (e.g., further into the freight container) or backwards (e.g., backing out of the freight container). This allows the chassis 102 and the support wheels 104 to constantly be in the proper orientation for longitudinal travel along the entire length of the freight container. This feature is further described in regards to FIG. 2 and FIG. 3.

In some embodiments, the chassis 102 may have a hydraulic motor (not shown) mounted to the chassis 102. The hydraulic motor may be drivingly interconnected with the support wheels 104, either directly or indirectly. For example, the hydraulic motor may be drivingly interconnected by a sprocket and chain assembly (not shown) to an axle connecting two of the support wheels (e.g., an axle between guide wheel 104-*a* and guide wheel 104-*c*). In some embodiments, the chassis 102 may have a second hydraulic motor (not shown) that is also drivingly interconnected by a sprocket and chain assembly (not shown) to an axle connecting two of the support wheels (e.g., an axle between guide wheel 104-*b* and guide wheel 104-*d*). The hydraulic motor(s) may drive the support wheels 104 to allow the wash rig 100 to move forwards and/or backwards.

In some embodiments, there may be a frame 120 attached to the chassis 102. As shown in the figure, the frame 120 may include a front frame 122 that is supported and held upright by support arm 124 and support arm 126. The front frame 122 may include a first vertical support 132 and a second vertical support 134. The front frame 122 may also include a first horizontal support 130 that is connected to the top of the first vertical support 132 and the top of the second vertical support 134. The front frame 122 may also include a second horizontal support (not shown) that is connected to the bottom of the first vertical support 132 and the bottom of the second vertical support 134. The first horizontal support 130, first vertical support 132, second vertical support 134, and the second horizontal support may be arranged to give the front frame 122 a rectangular shape. The front frame 122 may be positioned at the front of the chassis 102.

In some embodiments, the first horizontal support 130 may be attached to a set of washers 140 and/or a dryer. These washers 140 may be configured to spray or eject a cleaning fluid (e.g., water), and the washers 140 may be oriented or positioned in a way that the cleaning fluid is ejected upwards (e.g., towards the ceiling of a freight container). The dryer may be configured to direct air flow or eject air at high velocities, and the dryer may be oriented or positioned in a way that the air is also directed upwards (e.g., towards the ceiling of the freight container). In some embodiments, the set of washers 140 and/or the dryer may be incorporated in a boom that is attached to the first horizontal support 130.

In some embodiments, the first vertical support 132 may be attached to a set of washers 142 and/or a dryer. These washers 142 may be configured to spray or eject a cleaning fluid (e.g., water), and the washers 142 may be oriented or positioned in a way that the cleaning fluid is ejected to the left side of the wash rig 100 (e.g., towards the left side wall of a freight container). In some embodiments, the washers 142 may be oriented to face a direction that is 30 degrees to the left from the front of the wash rig 100, such that the washers 142 eject cleaning fluid at a diagonal direction (e.g., toward the front and left sides of the wash rig 100) in order to hit the left side wall of the freight container and any surfaces (e.g., floor or bulkhead) in front of the wash rig 100. The dryer may be configured to direct air flow or eject air at high velocities, and the dryer may be oriented or positioned in a way that the air is also directed to the left side of the wash rig 100 (e.g., towards the left side wall of the freight container). In some embodiments, the set of washers 142 and/or the dryer may be incorporated in a boom that is attached to the first vertical support 132.

In some embodiments, the second vertical support 134 may be attached to a set of washers 144 and/or a dryer. These washers 144 may be configured to spray or eject a cleaning fluid (e.g., water), and the washers 144 may be oriented or positioned in a way that the cleaning fluid is ejected to the left side of the wash rig 100 (e.g., towards the left side wall of a freight container). In some embodiments, the washers 144 may be oriented to face a direction that is 30 degrees to the right from the front of the wash rig 100, such that the washers 144 eject cleaning fluid at a diagonal direction (e.g., toward the front and right sides of the wash rig 100) in order to hit the right side wall of the freight container and any surfaces (e.g., floor or bulkhead) in front of the wash rig 100. The dryer may be configured to direct air flow or eject air at high velocities, and the dryer may be oriented or positioned in a way that the air is also directed to the left side of the wash rig 100 (e.g., towards the left side wall of the freight container). In some embodiments, the set of washers 144 and/or the dryer may be incorporated in a boom that is attached to the second vertical support 134.

In some embodiments, there may be a second horizontal support attached to a set of washers and/or a dryer 156. These washers may be configured to spray or eject a cleaning fluid (e.g., water), and the washers may be oriented or positioned in a way that the cleaning fluid is ejected towards the ground (e.g., towards the floor of a freight container). The dryer 156 may be configured to direct air flow or eject air at high velocities, and the dryer 156 may be oriented or positioned in a way that the air is also directed towards the ground and the rear of the wash rig 100, such that excess cleaning fluid or debris on the floor of the freight container is blown towards the rear of the wash rig 100. In some embodiments, the set of washers and/or the dryer 156 may be incorporated in a boom that is attached to the second horizontal support.

In some embodiments, the washers attached to the supports of the front frame 122 may be spray nozzles for spraying cleaning fluid (e.g., water). For example, each set of washers may be a series of nine nozzles that are spaced apart at equal distances. For instance, the first vertical support 132 may be attached to a set of nine nozzles spaced apart at equal distances, and each of those nine nozzles may be positioned towards the left side of the wash rig 100 in order to eject water towards the left side wall of the freight container as the wash rig 100 moves forward.

In some embodiments, the dryers attached to the supports of the front frame 122 may be air knives for directing air flow at high velocities. Additional information about the air knives is provided in regards to FIG. 6A and FIG. 6B.

In some embodiments, there may be one or more hose reels, such as hose reels 112, 114, and 116, that are mounted on a platform 110 attached to the chassis 102. Each of these hose reels may have a hose wound around the reel, and the hose reels may be configured to provide additional length of the hoses as the wash rig 100 moves forward. As the wash rig 100 moves backwards, the hose reels may rotate and the hoses may retract and be wound up by the reels.

In some embodiments, there may be an air compressor (not shown), a water source (not shown), and a hydraulic fluid source (not shown). These components may be attached to the wash rig 100 or be a part of the mobile platform 400 (seen in FIG. 4). The air compressor may compress air to be delivered to the dryers of the wash rig 100, and that compressed air may be delivered by an air hose coiled around one of the hose reels (e.g., hose reel 112). The air hose may connect the dryers attached to the front frame 122 to the air compressor to allow the dryers to draw compressed air from the air compressor for drying purposes.

The water source may supply cleaning fluid to be delivered to the washers of the wash rig 100, and the cleaning fluid may be delivered by a cleaning fluid hose coiled around one of the hose reels (e.g., hose reel 116). The water hose may connect the washers attached to the front frame 122 to the water source to allow the washers to draw cleaning fluid from the water source to be discharged onto the surfaces of the interior of the freight container. In some embodiments, the water source may be configured to supply both a cleaning fluid and water. The cleaning fluid hose may be a double hose consisting of two separate hoses joined side by side and coiled around the hose reel 116. One of the hoses may supply cleaning fluid from the water source to the washers on the front frame 122 (e.g., washers 140, 142, 144) to be sprayed onto the surfaces of the interior of the freight container. The other hose may supply water from the water source to the washers on the front flame 122 to also be sprayed to rinse off any cleaning fluid or debris on the surfaces. In some embodiments, the water source may supply water that is of a municipal water standard (e.g. tap water), which may be used as the cleaning fluid.

In some embodiments, the motor that drives the wash rig 100 may be a hydraulic motor. Thus, there may be a hydraulic fluid source that is coupled to the hydraulic components of the wash rig 100 by means of a hydraulic fluid hose coiled around a hose reel (e.g., hose reel 114). In some embodiments, the hydraulic fluid hose may also be a double hose consisting of two separate hoses joined side by side and coiled around the hose reel 114. Hydraulic fluid may be transported using the hydraulic fluid hose between the hydraulic fluid source and the hydraulic motor in order to propel the wash rig 100 forwards and backwards.

Thus, as the wash rig 100 travels forward (e.g., toward the closed end or bulkhead of the freight container), the reels 112, 114, and 116 may play out the hoses coiled around them. As the wash rig 100 travels backwards (e.g., toward the opening of the freight container or the mobile platform 400), there may be spring mechanisms (not shown) that cause the reels 112, 114, and 116 to rewind so that the hoses can be wound around the reels.

In some embodiments, the wash rig 100 may have one or more sensors (not shown). The sensors may have multiple purposes. There may be a sensor positioned towards the front of the wash rig 100 that is configured to detect how far away the bulkhead of the freight container is from the wash rig 100. Once the sensor detects that the front of the wash rig 100 is right next to the bulkhead (e.g., the wash rig 100 has traveled the entire length of the container), then wash rig 100 may be able to stop and reverse directions rather than crash into the bulkhead.

In some embodiments, the wash rig 100 may have a controller (e.g., an integrated circuit) that is capable of controlling aspects of the wash rig 100 based on received inputs from any sensors or inputs that are manually entered by the user. For instance, the controller may be able to adjust the time that the wash rig 100 is in operation, such as by speeding up the rate at which the wash rig 100 travels down the length of the freight container (in order to shorten washing time) or by slowing down the rate at which the wash rig 100 travels down the length of the freight container (in order to lengthen the washing time and improve the cleaning results). In some embodiments, the controller may be capable of directing the wash rig 100 to perform different cycles, such as wash-dry, wash-wash, dry-dry, and so forth. For instance, if a user directs the controller to execute a wash-dry cycle, the controller may in turn control the wash rig 100 by having the wash rig 100 do a first pass (e.g., traveling the entire length of the freight container and back) with all of the washers operating and then having the wash rig 100 do a second pass with only the dryers operating.

Figure 2:
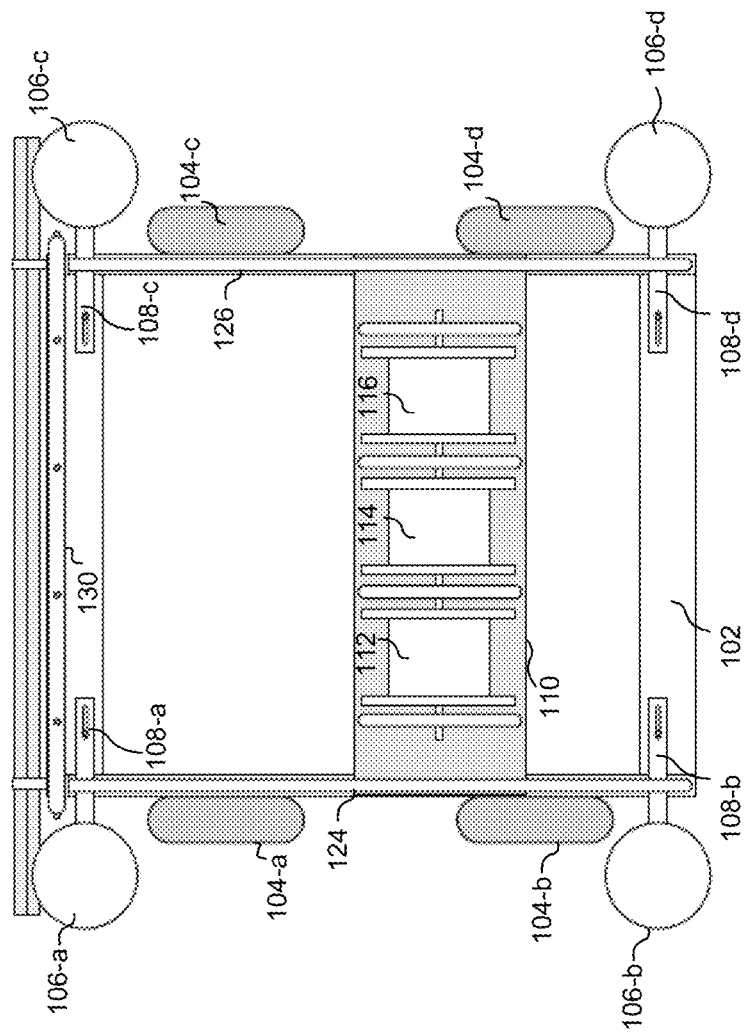
FIG. 2 illustrates a top-down view of a wash rig, in accordance with embodiments of the present disclosure.
Figure 3:
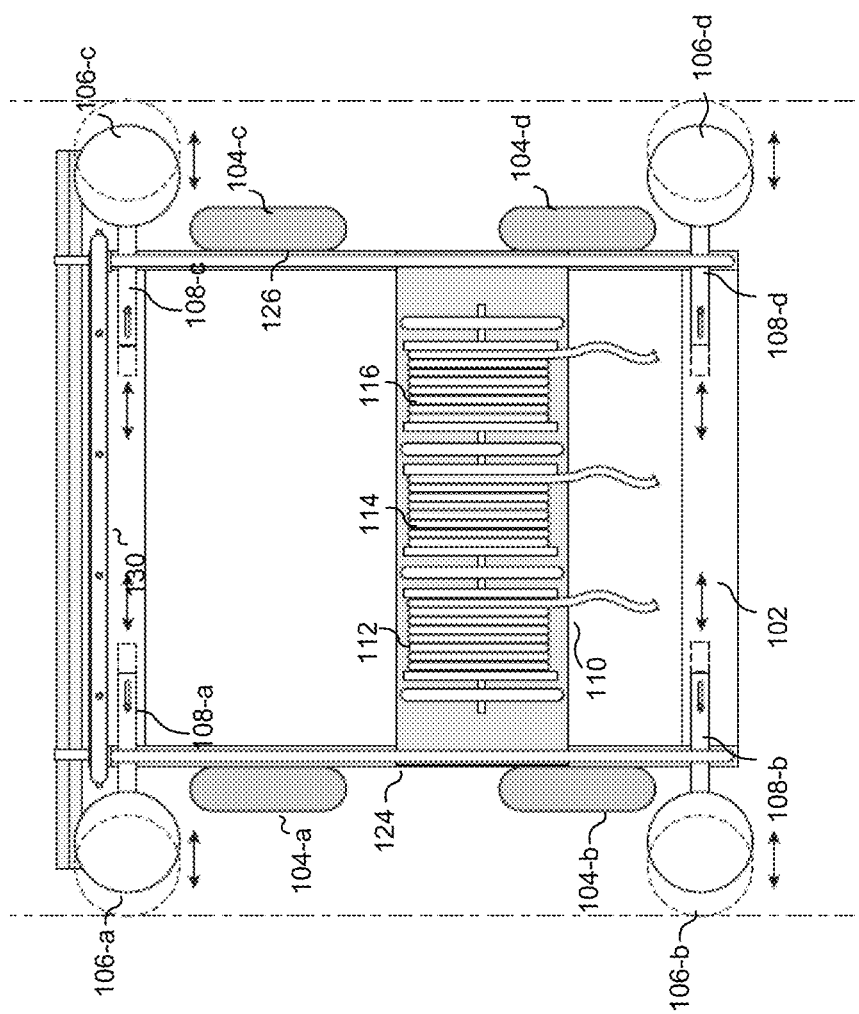
FIG. 3 illustrates a top-down view of a wash rig, in accordance with embodiments of the present disclosure.

FIG. 2 illustrates a top-down view of a wash rig 100, in accordance with embodiments of the present disclosure. FIG. 3 illustrates a top-down view of a wash rig 100, in accordance with embodiments of the present disclosure. More specifically, FIG. 2 and FIG. 3 illustrate how the arms 108 may be adjusted to reposition the guide wheels 106 inwards and outwards.

As shown in the figures, each of the guide wheels 106 may be slid outwards or inwards towards the chassis 102 by adjusting the arms 108 that each of the guide wheels 106 are connected to. For instance, the guide wheel 106-*a* may be slid outwards or inwards towards the chassis 102 by adjusting the arm 108-*a*.

In some embodiments, each of the arms 108 may be adjusted outwards or inwards towards the chassis 102. For instance, in some embodiments, each of the arms 108 may have an elongate hole for receiving a pair of bolt assemblies which secure that arm to the chassis 22. The extension of that arm relative to the chassis 102 may be varied by loosening the bolt assemblies, sliding the arm inwardly or outwardly, and then retightening the bolt assemblies. In this fashion, the distance between opposing pairs of guide wheels 106 (e.g., between the guide wheels 106-*a* and 106-*c* and between the guide wheels 106-*b* and 106-*d*) can be adjusted to accommodate freight containers of varying widths. Thus, the guide wheels 106 may be adjusted to engage the sides of a freight container, so that as the wash rig 100 travels forwards (e.g., further into the freight container) or backwards (e.g., backing out of the freight container) the guide wheels 106 will be in constant contact with the sides of the freight container. This allows the chassis 102 and the support wheels 104 of the wash rig 100 to constantly be in the proper orientation for longitudinal travel along the entire length of the freight container.

Figure 4:
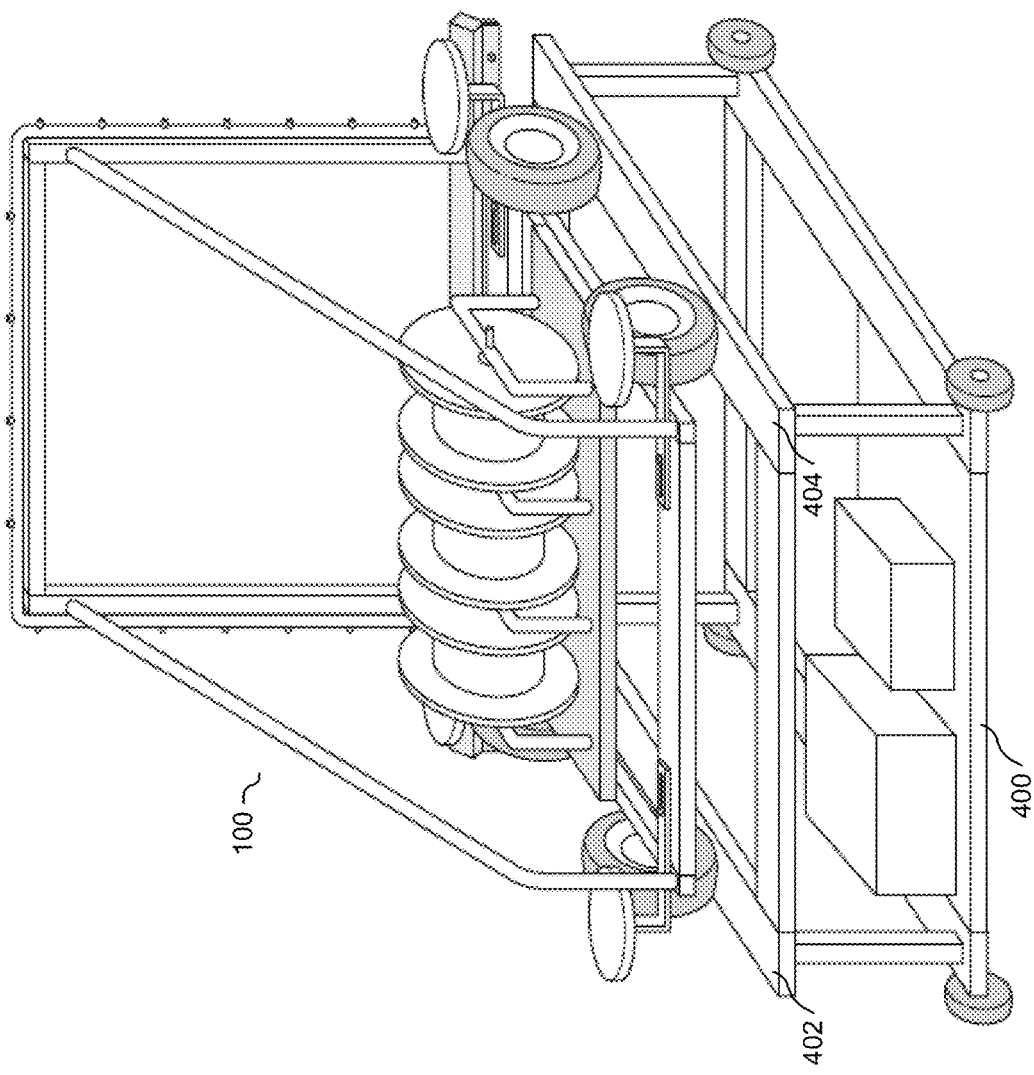
FIG. 4 illustrates a perspective view of a wash rig with a mobile platform, in accordance with embodiments of the present disclosure.

FIG. 4 illustrates a perspective view of a wash rig 100 with a mobile platform 400, in accordance with embodiments of the present disclosure. FIG. 5 illustrates a perspective view of a wash rig 100 with a mobile platform 400, in accordance with embodiments of the present disclosure.

In some embodiments, the wash rig 100 may be configured to be placed atop a mobile platform 400. During the washing operation, the wash rig 100 may be driven or propelled (e.g., by the hydraulic motors) off the mobile platform 400 and into the interior of an elongate, generally rectangular freight container 500 (e.g., as seen in FIG. 5). At the conclusion of the washing operation, the wash rig 100 may be propelled back onto the mobile platform 400.

With the wash rig 100 on top, the mobile platform 400 may be rolled around and positioned behind the open end of the freight container 500, in order to carry the wash rig 100 into alignment with the open end of the freight container 500. Furthermore, the mobile platform 400 may elevate the wash rig 100 to a sufficient height to enter the freight container 500. In some embodiments, the mobile platform 400 can be designed to be raised and lowered to accommodate freight containers which are positioned at different heights above the ground.

In some embodiments, the mobile platform 400 may also supply the wash rig 100 with cleaning fluid, water, power, compressed air, hydraulic fluid, and so forth. For instance, the mobile platform 400 may carry a water source that supplies cleaning fluid and/or water to the washers of the wash rig 100 through one of the hoses wound around one of the hose reels. The mobile platform 400 may also carry an air compressor for generating compressed air to be provided to the dryers through one of the hoses wound around one of the hose reels. The mobile platform 400 may also carry a power source for driving a motor of the wash rig 100, or the mobile platform 400 may carry the hydraulic fluid source for supplying hydraulic fluid to the wash rig 100 if it utilizes a hydraulic motor. Thus, the wash rig 100 can draw all these resources from the larger mobile platform 400 without having to carry any of them onboard the wash rig 100.

In some embodiments, during the washing operation, the wash rig 100 travels toward the closed end or bulkhead of the container 500. As the wash rig 100 traverses the length of the container 500, the wash rig 100 discharges cleaning fluid from the washers mounted onto the frame onto the surfaces of the interior of the container 500. For instance, the washers at the top of the frame will discharge cleaning fluid onto the ceiling of the container 500, while the washers at the bottom of the frame will discharge cleaning fluid onto the floor of the container 500. The washers on the sides of the frame will discharge cleaning fluid onto the sides of the container 500.

Furthermore, in some embodiments in which the cleaning fluid is not strictly water, the washers may be configured to also discharge water to rinse off the cleaning fluid (e.g., after the surfaces have already been washed with the cleaning fluid). Thus, the entire surfaces of the interior of the container 500 will be washed as the wash rig 100 traverses the length of the container 500. If the washers discharge fluid at high enough pressures and velocities, any debris or bacterial buildup on the surfaces of the interior of the container 500 will be knocked loose. In some embodiments, the motor(s) of the wash rig 100 may further be configured to drive a water pump that is used to draw cleaning fluid or water from the water source and provide the cleaning fluid or water to the washers at sufficiently high pressures.

While this is occurring, the wash rig 100 may discharge air flowing at high pressures or velocities from dryers onto the frame. The air may be discharged onto the surfaces of the interior of the container 500. For instance, the dryer at the bottom of the frame will discharge air towards the floor of the container 500 and backwards towards the opening of the container 500. The dryers on the sides of the frame will discharge air towards the sides of the container 500 and backwards towards the opening of the container. This will cause any excess cleaning fluid or water to be pushed towards the opening of the container as the wash rig 100 traverses the length of the container 500. In some embodiments, the wash rig 100 may also have a dryer at the top of the frame that will discharge air towards the ceiling of the container 500 and backwards towards the opening of the container 500. Thus, each of the surfaces of the interior of the container 500 may be dried off in this manner.

Thus, during the washing operation, the wash rig 100 may travel toward the closed end of the container 500, washing and drying as it moves along. Once the wash rig 100 reaches the closed end of the container 500, the wash rig 100 may cease discharging fluid from the washers and be driven backwards towards the opening of the container 500. As the wash rig 100 moves backwards, the dryers may still operate in order to force any cleaning fluid or excess water out towards the opening of the container 500.

In some embodiments, the mobile platform 400 may have tracks 402, 404 that the wash rig 100 may roll on to and off of. The tracks 402, 404 may include, or be made of, sheet-metal panels that are strong enough to support the full weight of the wash rig 100 when the wash rig 100 lies atop the mobile platform 400. In some embodiments, the sheet-metal panels may be 4'×8' and 3/16" thick, with a diamond pattern that makes the surface of the sheets more slip resistant (e.g., to prevent the wash rig 100 from accidentally rolling off the mobile platform 400).

Figure 6A:
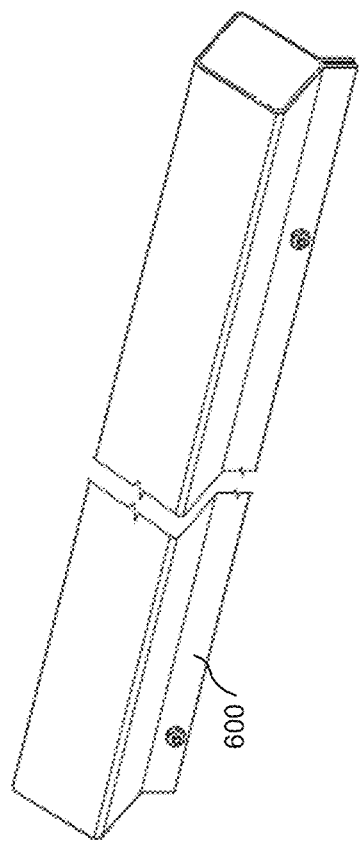
FIG. 6A illustrates a perspective view of an air knife, in accordance with embodiments of the present disclosure.
Figure 6B:
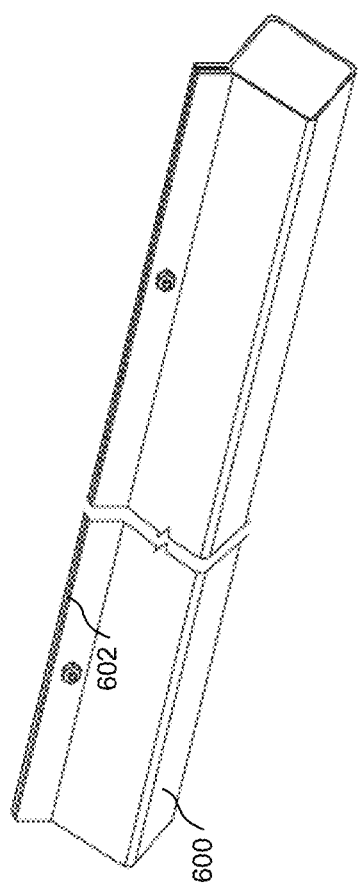
FIG. 6B illustrates a perspective view of an air knife, in accordance with embodiments of the present disclosure.
Figure 6C:
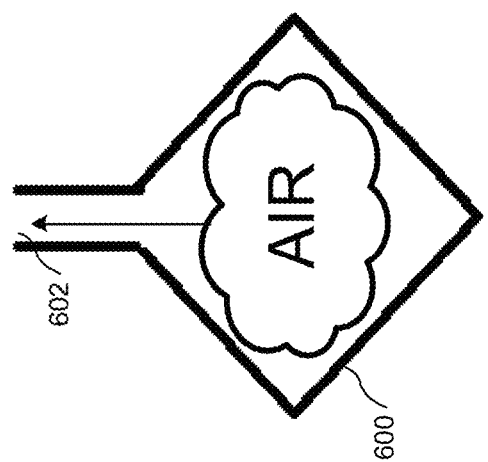
FIG. 6C illustrates a cutaway view of an air knife, in accordance with embodiments of the present disclosure.

FIG. 6A is a perspective view of an air knife 600, in accordance with embodiments of the present disclosure. FIG. 6B is a perspective view of an air knife 600, in accordance with embodiments of the present disclosure. FIG. 6C illustrates a cutaway view of an air knife, in accordance with embodiments of the present disclosure. The following paragraphs describe these three figures.

In some embodiments, the dryers used in the wash rig 100 may be air knives. An example of an air knife 600 is depicted in FIGS. 6A, 6B, and 6C. The air knife 600 may include a pressurized air plenum containing a series of holes or continuous, narrow slots 602 through which pressurized air exits. The exiting air carries a high velocity and will impact any surface at which the slots 602 are directed, which will blow off any liquid or debris on that surface. In some embodiments, the pressured air supplied to the air knife 600 may come from an air compressor.

For instance, FIG. 6C illustrates a cutaway view of the air knife 600. Air within the interior of the pressurized air plenum (e.g., the channel) of the air knife 600 can build up to high pressures before escaping through the slot 602 at high velocities.

Figure 7:
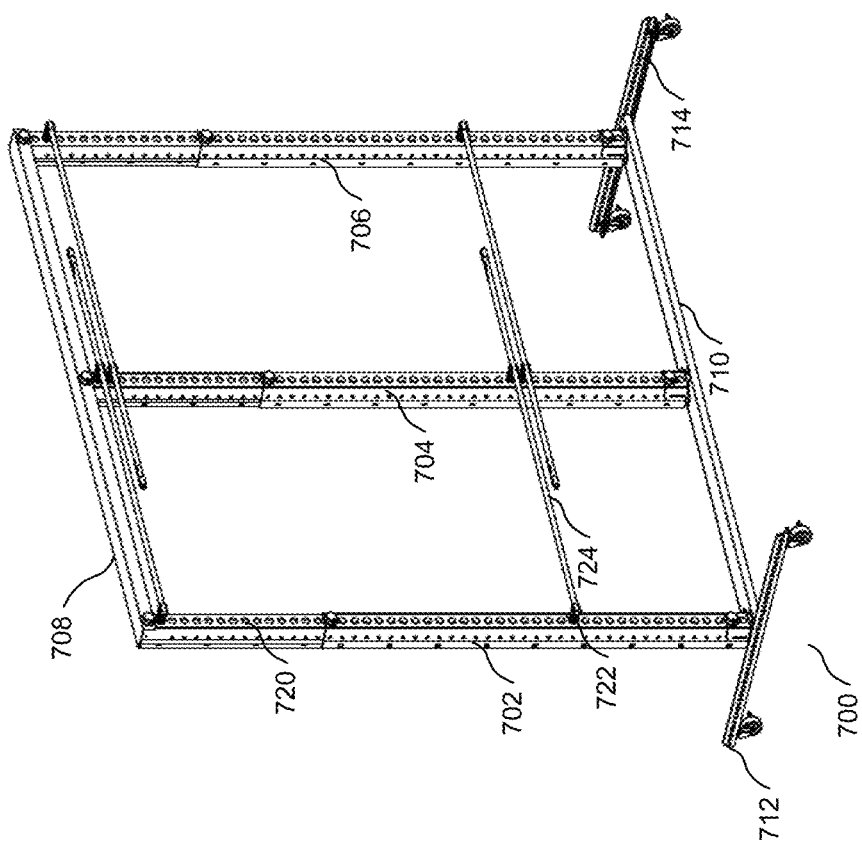
FIG. 7 illustrates a perspective view of a frame of an ultraviolet (UV) sanitation rig, in accordance with embodiments of the present disclosure.
Figure 8:
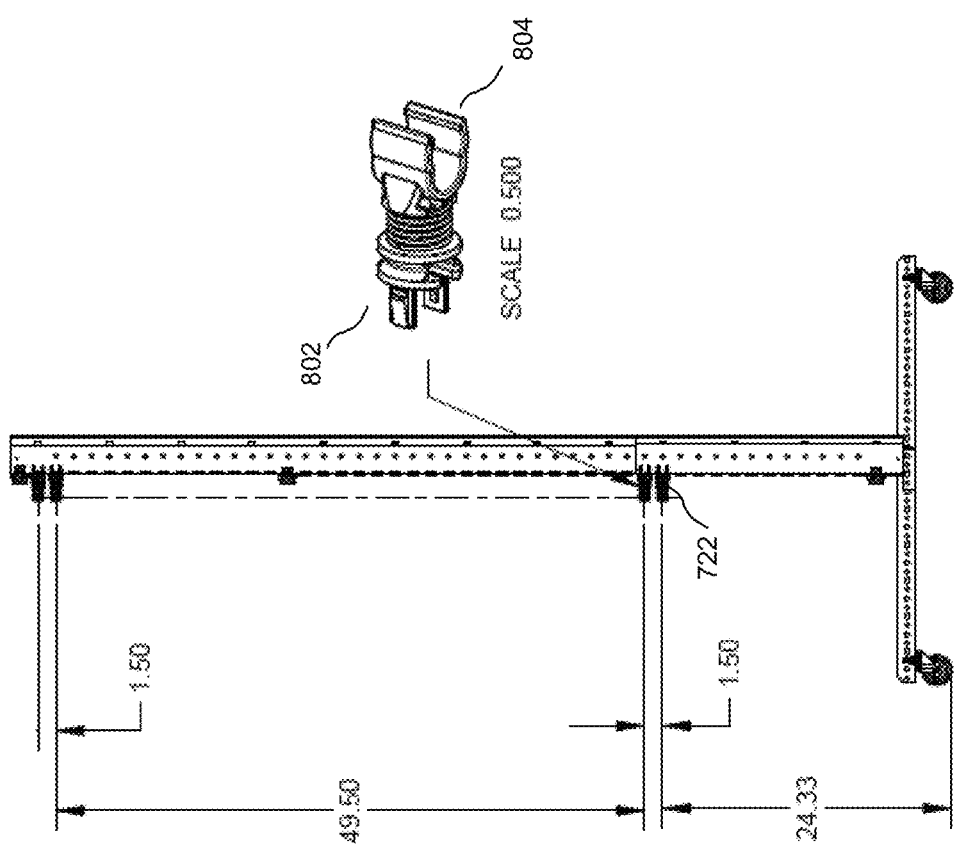
FIG. 8 illustrates a side view of a frame of an ultraviolet (UV) sanitation rig, in accordance with embodiments of the present disclosure.

FIG. 7 illustrates a perspective view of a frame of an ultraviolet (UV) sanitation rig, in accordance with embodiments of the present disclosure. FIG. 8 illustrates a side view of a frame of an ultraviolet (UV) sanitation rig, in accordance with embodiments of the present disclosure. The following description is applicable to both FIG. 7 and FIG. 8.

The ultraviolet (UV) sanitation rig may include one or more "frames", such as the frame 700 shown in the figure, with each frame being independently movable and capable of holding an independent set of UV lights. In some embodiments, the frame 700 may include a first vertical support 702, a second vertical support 704, and a third vertical support 706. As described herein, the term support may be used interchangeably with the term "strut" or the term "spanner". The second vertical support 704 may be positioned in between the first vertical support 702 and the third vertical support 706.

In some embodiments, the frame 700 may further include a first horizontal support 708 and/or a second horizontal support 710. The first horizontal support 708 may be orthogonally coupled to each of the first vertical support 702, the second vertical support 704, and the third vertical support 706. The second horizontal support 710 may also be orthogonally coupled to each of the first vertical support 702, the second vertical support 704, and the third vertical support 706. In this configuration, the first horizontal support 708 may be parallel to the second horizontal support 710. The first vertical support 702 may be parallel to the second vertical support 704, which in turn may be parallel to the third vertical support 706. In some embodiments, the first horizontal support 708 and the second horizontal support 710 may have lengths that span a substantial portion (e.g., 90% or more) of the width of the freight container.

Having both the first horizontal support 708 and the second horizontal support 710 may provide additional structural integrity to the frame 700. Similarly, the addition of the second vertical support 704 may provide additional structural integrity to the frame 700 (e.g., beyond having just the first vertical support 702 and the third vertical support 706), as well as allowing for shorter UV lamps to be coupled to the frame 700 (e.g., UV lamps that do not span the entire distance from the first vertical support 702 to the third vertical support 706).

In some embodiments, the frame 700 may further include one or more lateral supports, such as a first lateral support 712 and a second lateral support 714 at the bottom of the frame 700. As shown in the figure, the first lateral support 712 and the second lateral support 714 may be coupled to the opposing ends of the second horizontal support 710. There may be a set of wheels disposed on the first lateral support 712 and the second lateral support 714 to allow the frame 700 to be rolled around the floor of the freight container. For instance, the first lateral support 712 can have two wheels, with one wheel towards each end of the first lateral support 712, while the second lateral support 714 can also have two wheels (e.g., for a total of four wheels), with one wheel towards each end of the second lateral support 714. In some embodiments, these wheels may be locking casters that provide the frame 700 two degrees of freedom in movement along the floor of the freight container. In some embodiments, the first lateral support 712 and the second lateral support 714 may be spaced apart at a distance roughly equal to the width of the freight container while still allowing the frame 700 to fit perpendicularly inside the freight container.

In some embodiments, the frame 700 may have a mounting feature or structure configured to allow a series of UV lamps to be horizontally mounted to the frame 700. In some embodiments, the mounting feature may include one or more mounting holes 720 that are present on each of the first vertical support 702, the second vertical support 704, and the third vertical support 706. The mounting holes on the vertical supports may be aligned (e.g., a mounting hole on the first vertical support 702 will be at the same horizontal level as a corresponding mounting hole on the second vertical support 704 and a corresponding mounting hole on the third vertical support 706).

In some embodiments, a lamp clip 722 may be configured for insertion into each of the mounting holes 720. Each lamp clip 722 may include a frame-mounting end 802 and a lamp-mounting end 804. The frame-mounting end 802 of each lamp clip 722 may be inserted into a mounting hole 720 of the frame in order to couple the lamp clip 722 to the frame 700. In some embodiments, the lamp clip 722 may be attached to the frame in an orientation where the lamp-mounting end 804 of the lamp clip 722 is oriented to grasp a cylindrical UV lamp that is horizontally positioned across the frame 700. In some embodiments, the lamp clip 722 may be rotatable once attached to the frame 700 to allow the lamp-mounting end 804 to be re-positioned and oriented to grasp a cylindrical UV lamp that is horizontally positioned across the frame 700.

Figure 9:
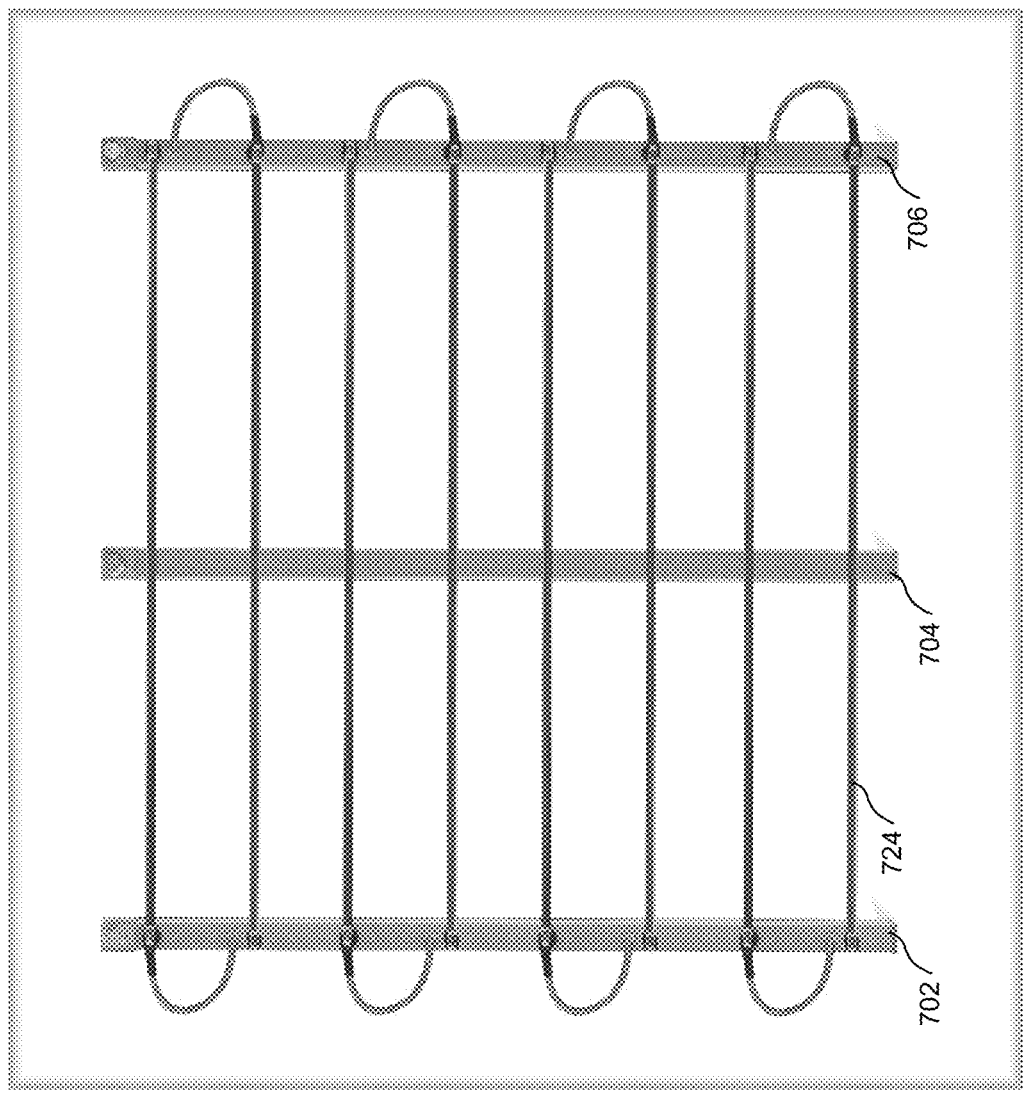
FIG. 9 illustrates ultraviolet (UV) lamps used with an ultraviolet (UV) sanitation rig, in accordance with embodiments of the present disclosure.

In some embodiments, the frame 700 may have one or more UV lamps 724 mounted on it. In some embodiments, each of the UV lamps 724 may be slender and cylindrically-shaped, with a length that spans at least the distance between two of the vertical supports. An UV lamp 724 may be held in place by two or more lamp clips (e.g., lamp clip 722) attached to the frame 700. For instance, the figure shows a UV lamp 724 with a length that exceeds the distance between the first vertical support 702 and the second vertical support 704, which is held in place by a lamp clip on the first vertical support 702 and a lamp clip on the second vertical support 704. Both of the lamp clips are at the same horizontal level (e.g., they are attached to two corresponding mounting holes from the first vertical support 702 and the second vertical support 704), which results in the UV lamp 724 being held in a horizontal orientation. In some embodiments, each UV lamp 724 may span from the first vertical support 702 to the third vertical support 706 (e.g., the width of the frame 700), as depicted in FIG. 9. An entire set of UV lamps can be held in such a configuration in order to fill up the frame 700 with rows of UV lamps.

FIG. 9 illustrates ultraviolet (UV) lamps used with an ultraviolet (UV) sanitation rig, in accordance with embodiments of the present disclosure.

Shown in the figure is a first vertical support 702, a second vertical support 704, and a third vertical support 706 (e.g., all belonging to a frame 700). There are a set of UV lamps (e.g., UV lamp 724) held in place across the supports in a horizontal fashion. For instance, the left end of UV lamp 724 is shown attached to the first vertical support 702 (e.g., by a lamp clip attached to the first vertical support 702) and the right end of UV lamp 724 is shown attached to the third vertical support 706 (e.g., by a lamp clip attached to the third vertical support 706), such that the UV lamp 724 spans the distance between the first vertical support 702 and the third vertical support 706. Rows of UV lamps may be mounted to the frame in this fashion.

Figure 10:
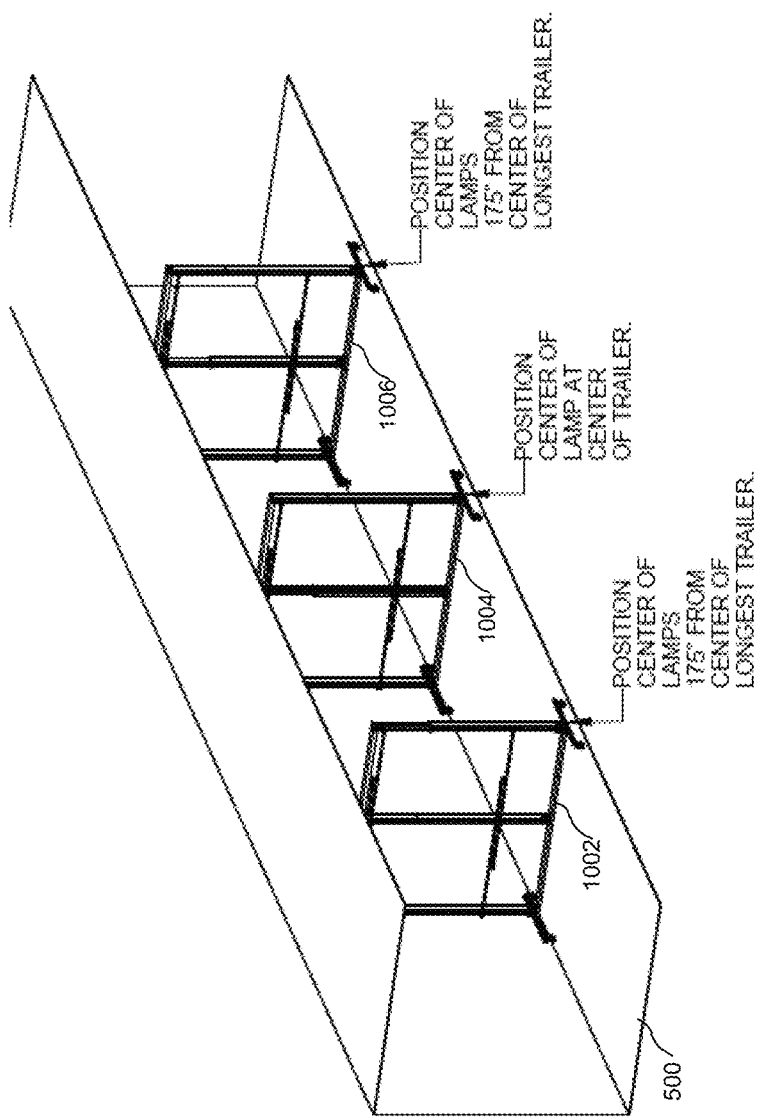
FIG. 10 illustrates a perspective view of an ultraviolet (UV) sanitation rig deployed in a freight container, in accordance with embodiments of the present disclosure.

FIG. 10 illustrates a perspective view of an ultraviolet (UV) sanitation rig deployed in a freight container, in accordance with embodiments of the present disclosure.

The UV sanitation rig may include one or more "frames", such as the frame 700 shown in FIG. 7, with each frame being independently movable and capable of holding an independent set of UV lamps (e.g., like the ones shown in FIG. 9). Accordingly, FIG. 10 illustrates a UV sanitation rig with three frames: a first frame 1002, a second frame 1004, and a third frame 1006.

In some embodiments, deploying this UV sanitation rig in a freight container 500 may involve moving the third frame 1006 along the floor (e.g., by rolling it using the wheels attached to the bottom of the frame) of the freight container 500 towards the bulkhead until the third frame 1006 is positioned at a displacement of 175 inches from a center of the freight container 500. The second frame 1004 can be rolled along the floor to position the second frame 1004 at the center of the freight container 500. The first frame 1002 can be rolled along the floor to position the first frame 1002 at a displacement of −175 inches from the center of the freight container 500. As seen in FIG. 10, for a freight container 500 with considerable length, this deployment leaves the three frames spaced out rather evenly along the length of the freight container 500. This allows the simultaneous operation of the three frames (e.g., turning on all of the UV lamps) to provide substantial UV light coverage over all of the interior surfaces of the freight container 500. Since the intensity of light decreases exponentially with increasing distance from the light source, it is important that enough frames are used to allow the entirety of the interior surfaces of the freight container 500 to receive enough light for sanitation purposes. Additional frames can be utilized, or the frames may be re-positioned, based on the length of the freight container 500.

In some embodiments, the UV lamps of each frame may be synchronized and may turn on/off together. In some embodiments, the UV lamp of each frame may be controlled remotely, such that a person can deploy the frames within the freight container 500 and then remotely turn on all of the UV lamps once the person has reached safe distance (e.g., moved out of the freight container 500). After sanitation has concluded, that person may be able to remotely turn off all of the UV lamps in order to retrieve the UV sanitation rig.

Figure 11:
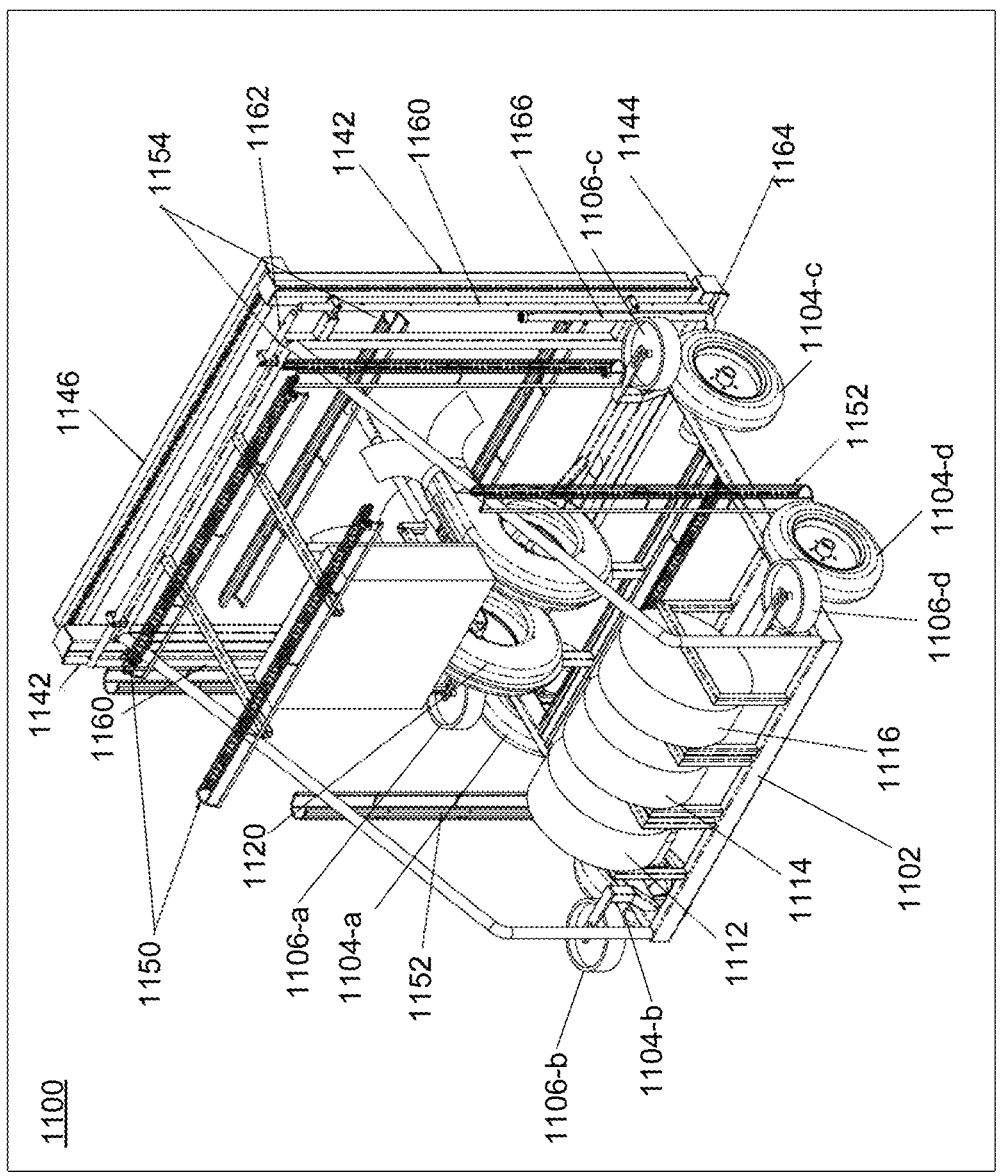
FIG. 11 illustrates a perspective view of a combined ultraviolet (UV) sanitation and wash rig, in accordance with embodiments of the present disclosure.
Figure 12:
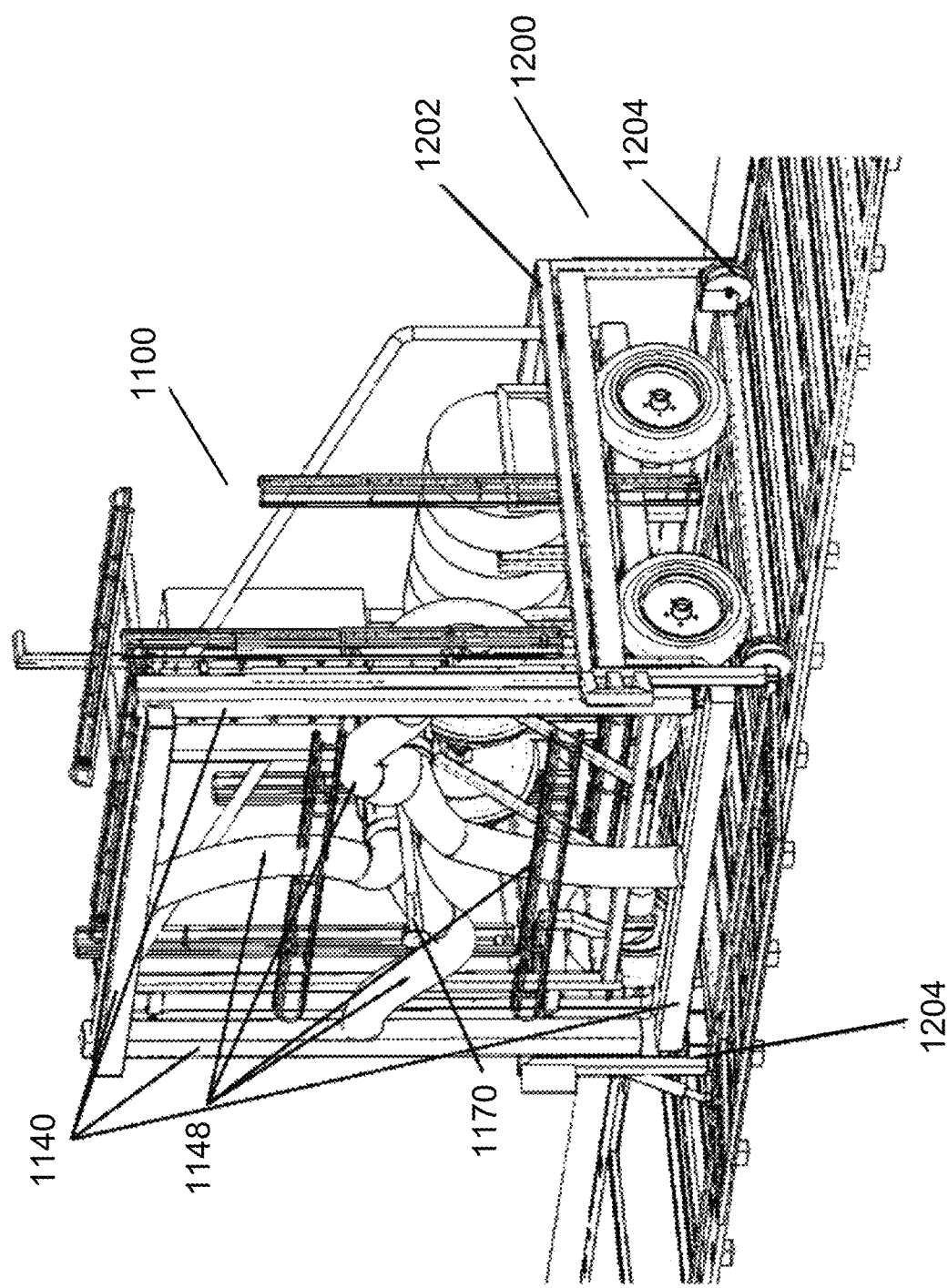
FIG. 12 illustrates a perspective view of a combined ultraviolet (UV) sanitation and wash rig and accompanying carriage, in accordance with embodiments of the present disclosure.

FIGS. 11-12 illustrate a perspective view of a combined ultraviolet (UV) sanitation and wash rig, in accordance with embodiments of the present disclosure. For the purposes of convenience, the combined ultraviolet (UV) sanitation and wash rig may simply be referred to as the rig 1100, with respect to FIGS. 11-13. The following paragraphs discuss FIGS. 11-12 together.

In some embodiments, the rig 1100 may have a chassis 1102. Attached to the chassis 1102 may be a set of support wheels, such as the support wheels 1104-*a*, 1104-*b*, 1104-*c*, and 1104-*d* (collectively referred to as the support wheels 1104). As shown in the figure, the support wheels 1104 include four support wheels that are vertically-oriented (e.g., such that the wheels have a lateral or horizontal rotational axis), with two on each side of the chassis 1102 (e.g., two on the left side and two on the right side). However, in other embodiments, there may be any number of support wheels (e.g., six support wheels, eight support wheels, and so forth). The support wheels 1104 may be independently mounted to the chassis 1102 or they may be mounted to axles attached to the chassis 1102 (e.g., each pair of opposing support wheels may be connected by an axle, such as in a car). In some embodiments, the support wheels 1104 may be air-filled, while in other embodiments, the support wheels 1104 may be solid all the way through.

In some embodiments, the support wheels 1104 may be configured to provide the rig 1100 at least bi-directional movement. For instance, each of the support wheels 1104 may be able to spin around their rotational axis in order to allow the rig 1100 to move forwards (e.g., further into a freight container) or backwards (e.g., retracting from the freight container). In some embodiments, the support wheels 1104 may also be configured to allow the rig 1100 to turn left and right as it is moving forwards or backwards (e.g., similar to how a car turns). For instance, the front pair of support wheels (e.g., support wheels 1104-*a* and 1104-*c*) may be able to turn left or right together in a coordinated fashion. In some of such embodiments, the front pair of support wheels may be connected by an axle that allows the wheels to turn together in a coordinated fashion. In some embodiments, some or all of the support wheels 1104 may be on a fixed axle that allows those support wheels 1104 to spin around their rotational axis in order to allow the rig 1100 to move forwards or backwards, but the fixed axle may prevent the support wheels 104 from pivoting (e.g., to turn the rig 1100 left or right).

In some embodiments, there may also be a set of guide wheels, such as the guide wheels 1106-*a*, 1106-*b*, 1106-*c*, and 1106-*d* (collectively referred to as the guide wheels 1106), that are attached to the chassis 1102. As shown in the figure, the guide wheels 1106 include four guide wheels that are horizontally-oriented (e.g., such that the wheels have a vertical rotational axis), with two on each side of the chassis 1102 (e.g., two on the left side and two on the right side). However, in other embodiments, there may be any number of guide wheels (e.g., two guide wheels with one each side of the chassis 1102, six support wheels, and so forth).

In some embodiments, the guide wheels 1106 may be attached to the chassis 1102 via arms that project outwards from the chassis 1102, such that the guide wheels 1106 are extended outward from the chassis 1102. This allows the guide wheels to engage the sides of a freight container as the rig 1100 travels forwards (e.g., further into the freight container) or backwards (e.g., backing out of the freight container), keeping the rig 1100 traveling straight and preventing the rig 1100 from crashing into the sides of the freight container.

Figure 13:
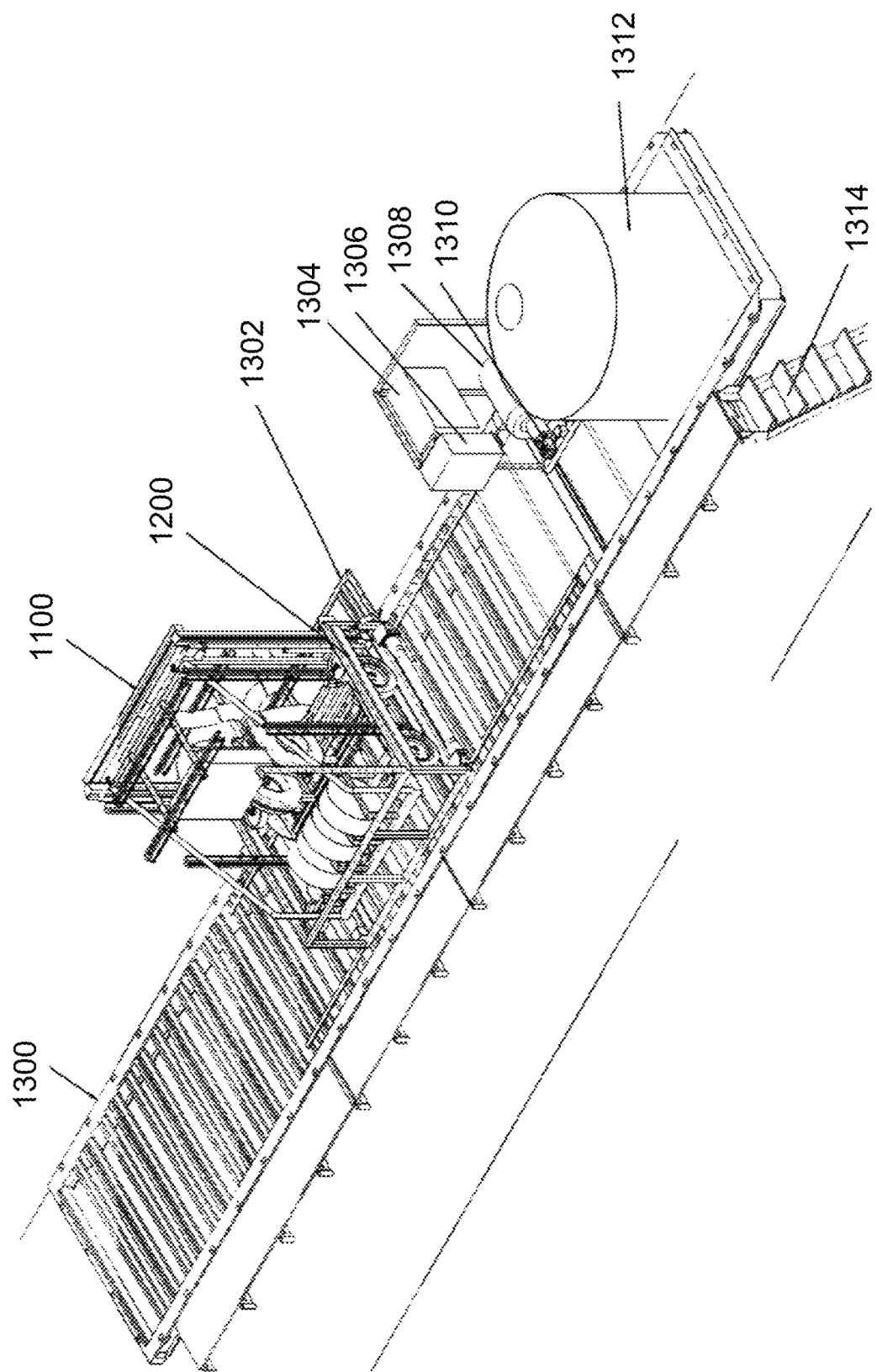
FIG. 13 illustrates a perspective view of a combined ultraviolet (UV) sanitation and wash rig, carriage, and deck, in accordance with embodiments of the present disclosure.

In some embodiments, there may be an electrical power source (not shown), a water source (not shown), and a hydraulic fluid source (not shown). These components may be attached to the rig 1100 or be a part of the carriage or deck (as seen in FIG. 13). In some embodiments, there may be one or more reels, such as reels 1112, 1114, and 1116, that are mounted on a platform attached to the chassis 1102. Each of reels may enable a cable or hose to be wound around the reel, and the reels may be configured to spin in order to provide additional length of cable or hose as the rig 1100 moves forward. In some embodiments, as the rig 1100 moves backwards, the reels may rotate in order to retract any cable or hose wound around the reel. In some embodiments, reel 1112 may be an electrical AC/DC reel that holds an electrical cable, which can be used to draw power from the electrical power source to operate the dryers (e.g., blower fans), UV lights, and so forth. In some embodiments, reel 1114 may be a water supply hose reel that holds the water supply hose, which can be used to draw water from the water source and supply the water (e.g., cleaning fluid) to the washers (e.g., nozzles on spray bars). In some embodiments, reel 1116 may be a hydraulic supply/return hose reel, which can be used to draw hydraulic fluid from the hydraulic fluid source and supply the hydraulic fluid to the hydraulic motor.

In some embodiments, there may be one or more UV light shrouds attached to the chassis 1102. As shown in FIG. 11, there are two UV light shrouds 1150 on top of the rig 1100 and facing upwards, there are two side UV light shrouds 1152 (e.g., one on the left side of the chassis 1102 and another on the right side of the chassis 1102), and there are two front-facing UV light shrouds 1154. These UV light shrouds may draw power from the electrical AC/DC cable and provide substantial UV light coverage over all of the interior surfaces of the freight container as the rig 1100 operates. For instance, the two UV light shrouds 1150 on top of the rig 1100 would emit UV light upwards to sanitize the roof of the freight container. The side UV light shrouds 1152 would emit UV light to the sides in order to sanitize the sides of the freight container. The front-facing UV light shrouds 1154 would emit UV light forwards in order to sanitize the surfaces in the forward path of the rig 1100, including the floor and back wall of the freight container. In some embodiments, all of the UV lights may be synchronized and may turn on/off together. For instance, they may all be turned on during the operation of the rig 1100 in order to ensure that the interior surfaces of the freight container are completely sanitized when the rig 1100 moves forward and backward in the freight container.

In some embodiments, the chassis 1102 may have one or more hydraulic motors (not shown) mounted to the chassis 1102. The hydraulic motor(s) may be drivingly interconnected with the support wheels 1104, either directly or indirectly. For example, a hydraulic motor may be drivingly interconnected by a sprocket and chain assembly (not shown) to an axle connecting two of the support wheels. The hydraulic motor(s) may drive the support wheels 1104 to allow the rig 1100 to move forwards and/or backwards. In some embodiments, there may be four-wheel drive capability (e.g., such that torque is being delivered to each of the support wheels 1104). There may be a hydraulic fluid source that is coupled to the hydraulic components of the rig 1100 by means of the hydraulic supply/return hose coiled around a hose reel (e.g., reel 1116). In some embodiments, the hydraulic supply/return hose may also be a double hose consisting of two separate hoses joined side by side and coiled around the reel 1116. Hydraulic fluid may be transported using the hydraulic supply/return hose between the hydraulic fluid source and the hydraulic motor in order to propel the rig 1100 forwards and backwards.

In some embodiments, there may be a number of washers attached to the chassis 1102. As shown in FIG. 11, there are two sets of side washers 1160 on both sides of the chassis 1102 towards the front of the chassis 1102 and directed towards the sides. In some embodiments, each set of side washers 1160 on the side of the chassis 1102 may be associated with low pressure side spray bars. There is a top set of washers 1162 on top of the chassis 1102 and directed upwards. In some embodiments, the top set of washers 1162 may be associated with a low pressure roof spray bar. There is a bottom set of washers 1164 on the bottom of the chassis 1102 and facing at an angle between forwards and downwards. In some embodiments, the bottom set of washers 1164 may be associated with a low pressure floor spray bar. The low pressure spray bars may be used in low pressure wash cycles (described in additional detail in regards to FIG. 13). The sets of washers 1160, 1162, and 1164 may receive water from the water supply hose and spray that water over the interior surfaces of the freight container for cleaning purposes. For instance, the top set of washers 1162 may spray water upwards to clean the roof of the freight container. The side sets of washers 1160 may spray water to the sides to clean the sides of the freight container. The bottom set of washer 1164 may be angled to spray water downward and forward to clean the floor of the freight container, but also to clean where the floor of the freight container meets the bulkhead. In some embodiments, each washer may be a spray nozzle and a set of washers may be an array of spray nozzles. In some embodiments, an array of spray nozzles may include four or six nozzles in the array, while in other embodiments there may be more or less nozzles in the array. In some embodiments, a set of washers may include four arrays of spray nozzles (e.g., the sets of washers 1160, 1162, and 1164 may each involve four arrays of spray nozzles). In some embodiments, there may be four to six spray nozzles (not shown) located at the front of the chassis 1102 that can be used to spray water at the bulkhead of the freight container.

In some embodiments, there may be also be additional sets of washers besides the sets of washers 1160, 1162, and 1164. For instance, in some embodiments, on each side of the chassis 1102 may be a set of washers 1166. In some embodiments, each set of washers 1166 may be associated with a high pressure side/floor spray bar that is configured to receive water from the water supply hose and spray that water towards the sides and floor of the freight container at high pressure. The high pressure side/floor spray bar may be used in high pressure wash cycles (described in additional detail in regards to FIG. 13). The water source may supply water (e.g., cleaning fluid) to all of the washers of the rig 1100 via the water supply hose associated with the water supply hose reel (e.g., reel 1114). This may allow the washers to draw cleaning fluid from the water source to be discharged onto the surfaces of the interior of the freight container. In some embodiments, the water source may be configured to simultaneously supply both a cleaning fluid and water. In some embodiments, the water source may supply water that is of a municipal water standard (e.g. tap water).

In some embodiments, there may be a number of dryers 1140 attached to the chassis 1102. The dryers 1140 may be configured to direct air flow or eject air at high velocities, and the dryers 1140 may be oriented or positioned in a way that the air is directed in a particular direction. As shown in FIG. 11, there are two side dryers 1142 on both sides of the chassis 1102 towards the front of the chassis 1102 and directed towards the sides. In some embodiments, the two side dryers 1142 may be side air knives. There is a top dryer 1146 on top of the chassis 1102 and directed upwards. In some embodiments, the top dryer 1146 may be a roof air knife. There is a bottom dryer 1144 on the bottom of the chassis 1102 and facing downwards. In some embodiments, the bottom dryer 1144 may be a floor air knife. The dryers 1146, 1142, and 1144 are collectively depicted as dryers 1140 in FIG. 12. The dryers 1140 may receive air from one or more blowers 1120 and eject that air to dry the interior surfaces of the freight container. For instance, top dryer 1146 may blow air upwards to dry the roof of the freight container. The side dryers 1142 may blow air to the sides to dry the sides of the freight container. The bottom dryer 1144 may blow air downwards to dry the floor of the freight container.

In some embodiments, the blowers 1120 may be blower fans that supply air the dryers via fan ducting 1148. In some embodiments, such as the embodiment shown in FIG. 11, there may be two blowers 1120, each of which may be a 2000 CFM blower fan, that each supplies air to two of the dryers via fan ducting. For instance, a left blower fan may supply air to a side dryer 1142 on the left side and the bottom dryer 1144, while a right blower fan may supply air to a side dryer 1142 on the right side and the top dryer 1140. In some embodiments, there may be any number of blowers 1120 and fan ducting 1148 used to supply air to the dryers.

In some embodiments, the various washers and dryers of the rig may be attached to the chassis 1102 via a frame that includes a top horizontal support, a bottom horizontal support, and two side vertical supports, as in the case with the rig shown in FIG. 1. Thus, washers and dryers directed towards the roof of the freight container may be mounted on the top horizontal support, washers and dryers directed towards the floor of the freight container may be mounted on the bottom horizontal support, and washers and dryers directed towards the sides of the freight container may be mounted on the side vertical supports of the frame.

In some embodiments, the rig 1100 may have one or more sensors, such as the stop sensor rod 1170 shown in FIG. 12. The stop sensor rod 1170 may be positioned towards the front of the rig 1100. It may extend forward and away from the chassis 1102 so that it can be used to detect the bulkhead of the freight container. As the rig 1100 travels through the freight container, the stop sensor rod 1170 may collide with the bulkhead which will signal that the rig 1100 has traveled the entire length of the container. This may cause the rig 1100 to and reverse directions rather than continuing forwards towards the bulkhead.

In some embodiments, the rig 1100 may be configured to be seated within a carriage 1200. The carriage 1200 may have a frame 1202 and a set of transverse wheels 1204. In some embodiments, such as the embodiment shown in FIG. 12, the carriage 1200 may have four transverse wheels 1204, with two on each side of the carriage. The transverse wheels 1204 of the carriage 1200 may be oriented perpendicular to the support wheels 1104 of the rig 1100 when the rig 1100 is seated in the carriage 1200. The function of the transverse wheels 1204 may be move the carriage 1200 and the rig 1100 laterally along the deck (shown in FIG. 13) in order to align the rig 1100 with the entrance of a freight container.

FIG. 13 illustrates a perspective view of a combined ultraviolet (UV) sanitation and wash rig, carriage, and deck, in accordance with embodiments of the present disclosure.

In particular, the rig 1100 is shown in a carriage 1200 seated on a deck 1300. The deck 1300 may be a trailer deck or equivalent dock platform. The deck 1300 can be a stationary or mobile platform, and it is configured to hold the rig 1100 as well as support equipment associated with the rig 1100 (e.g., the hydraulic fluid source, the electrical power source, and the water source or cleaning fluid source). In some embodiments, the deck 1300 may have a loading ramp 1300. The loading ramp 1300 may be aligned with the entrance of a freight container to allow the rig 1100 to move off the carriage 1200 and into the freight container. In some embodiments, the loading ramp 1300 may have a hydraulic cylinder that allows it to be raised and lowered to meet the elevation of the floor of the freight container. In some embodiments, the loading ramp 1300 may also be movable laterally along the deck 1300. Thus, both the loading ramp 1300 and the carriage 1200 can be moved laterally along the deck 1300 to align the rig 1100 with the entrance of the freight container. Then the loading ramp 1300 can be adjusted to the elevation of the freight container (e.g., raised or lowered to contact the floor of the freight container) so that the rig 1100 can be deployed.

In some embodiments, the deck 1300 may have a hydraulic fluid source 1304, an enclosure 1306, an electrical power source 1308, and a hydraulic fluid pump 1310. In some embodiments, the hydraulic fluid source 1304 may be a 50 gallon hydraulic tank, the enclosure 1306 may be a high voltage electrical enclosure, the electrical power source 1308 may be a 50 HP electric motor, and the hydraulic fluid pump 1310 may be a pressure compensated hydraulic pump. The electrical power source 1308 may be used to operate the hydraulic fluid pump 1310 in order to supply the rig 1100 with hydraulic fluid from the hydraulic fluid source 1304 through the hydraulic supply/return hose wound around the reel 1114 of the rig 1100. The electrical power source 1308 may also supply electrical power to the components of the rig 1100 via the electrical AC/DC cable wound around the reel 1112 of the rig 1100. In some embodiments, the deck 1300 may have stairs 1314 that a human operator can use to climb on top of the deck 1300 in order to operate the system (e.g., to control the rig 1100, carriage 1200, and the loading ramp 1302).

In some embodiments, an operator of a typical trailer (e.g., a truck with a freight container) may back up the trailer towards the deck 1300 and dock with the deck 1300 by aligning the entrance of the freight container with the loading ramp 1302. Once the freight container has been docked, a human operator can select the types of cleaning cycles to be performed by the rig 1100. Types of cleaning cycles may include any combination and order of: high pressure wash cycle, low pressure wash cycle, air knife drying, and UV light application. In some embodiments, the UV lights can be turned on or off in any cleaning cycle, and they are not restricted to operation in a standalone fashion. For example, the UV lights can remain on during washing and drying of the freight container.

In some embodiments, the high pressure wash cycles may engage the high pressure spray bars (e.g., the sets of washers 1166 in FIG. 11) configured to spray water at high pressures. The high pressure wash cycle may include spray in and out, such that the rig 1100 continues to spray water through the high pressure spray bars while the rig 1100 goes in and out of the freight container. In some embodiments, the low pressure wash cycle may engage the low pressure spray bars (e.g., the sets of washers 1160, 1162, and 1164 in FIG. 11). The low pressure wash cycle may include low flow in and dry cycle out, such that the rig 1100 sprays water through the low pressure spray bars while the rig 1100 goes forward in the freight container before switching to drying (e.g., blowing air through the dryers) while the rig 1100 backs out of the freight container. In some embodiments, the air knife drying cycle may be a drying only cycle, such that the rig 1100 blows air through the dryers while it goes forward and backwards in the freight container.

In some embodiments, washing may be performed for the entire cycle, such that in either the high pressure wash cycle or the low pressure wash cycle, the rig 1100 can enter the freight container spraying water and also back out of the container spraying water. In some embodiments, drying (e.g., blowing air through the dryers) can be performed for part of each cycle, such that in either the high pressure wash cycle or the low pressure wash cycle, the rig 1100 can enter the freight container spraying water and back out of the freight containing drying. In some embodiments, drying (e.g., blowing air through the dryers) can be performed during the UV sanitation cycle, such that the rig 1100 has both the UV lamps and dryers activated while traveling forward and backward in the freight container.

Once the types of cleaning cycles are selected, the operator may initiate the operation of the rig. The rig 1100 may drive forward, down the loading ramp 1302 and into the entrance of the freight container and perform the selected types of cleaning. The rig 1100 may continue performing cleaning cycle(s) until the end of the freight container is reached (e.g., when the stop sensor rod 1170 on the rig 1100 hits the bulkhead of the freight container), which may cause the rig 1100 to automatically reverse direction. The rig 1100 may continue to perform cleaning cycle(s) until the rig 1100 exits the freight container and returns to the carriage 1200 on the deck 1300. Once returned to the carriage 1200, the rig 1100 may cease cleaning and turn off. Another freight container can then be docked and the whole process repeated.

The various aspects, embodiments, implementations or features of the described embodiments can be used separately or in any combination.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device, comprising:
    a wheeled chassis having a front and a rear, wherein the wheeled chassis is adapted to fit in an interior of a freight container, and wherein the interior of the freight container comprises a set of surfaces including a floor, a first wall, second wall, a ceiling, and a bulkhead;
    a motor coupled to the wheeled chassis and configured drive wheels of the wheeled chassis in order to propel the wheeled chassis longitudinally back and forth along the floor of the freight container;
    a frame mounted on the wheeled chassis, wherein the frame comprises:
        a first vertical support having a first side dryer and a first set of washers, wherein the first side dryer is directed towards the rear of the chassis and configured to direct air towards the first wall, and wherein the first set of washers are directed toward the front of the chassis and configured to direct cleaning fluid to the first wall;
        a second vertical support having a second side dryer and a second set of washers, wherein the second side dryer is directed towards the rear of the chassis and configured to direct air towards the second wall, and wherein the second set of washers are directed toward the front of the chassis and configured to direct cleaning fluid to the second wall;
        a first horizontal support connecting the first vertical support and the second vertical support, wherein the horizontal support has a bottom dryer and a third set of washers, wherein the bottom dryer is directed towards the rear of the chassis and configured to direct air towards the floor, and wherein the third set of washers are directed toward the front of the chassis and configured to direct cleaning fluid to the floor;
        a second horizontal support connecting the first vertical support and the second vertical support, wherein the horizontal support has a top dryer and a fourth set of washers, wherein the top dryer is directed towards the rear of the chassis and configured to direct air towards the ceiling, and wherein the fourth set of washers are directed toward the front of the chassis and configured to direct cleaning fluid to the ceiling.

2. The device of claim 1, wherein the first, second, third, and fourth sets of washers are brushless, and
    wherein the device does not comprise brushes coupled to the frame.

3. The device of claim 1, wherein the first, second, third, and fourth sets of washers are spray nozzles.

4. The device of claim 1, wherein the first, second, third, and fourth sets of washers each comprise an array of four spray nozzles disposed in a spray bar.

5. The device of claim 1, wherein the first, second, third, and fourth set of washers are non-rotating nozzles.

6. The device of claim 1, wherein the first, second, third, and fourth set of washers are each configured to discharge a fluid at ambient temperature.

7. The device of claim 1, wherein the first, second, third, and fourth set of washers are each configured to discharge a soap-less fluid.

8. The device of claim 1, wherein the first side dryer comprises a first set of air knives, wherein the second side dryer comprises a second set of air knives, wherein the bottom dryer comprises a third set of air knives, and wherein the top dryer comprises a fourth set of air knives.

9. The device of claim 1, wherein the first, second, third, and fourth set of washers are fluidly coupled to a water source, and wherein the first side dryer, second side dryer, bottom dryer, and top dryer are fluidly coupled to one or more air blowers coupled to the chassis.

10. The device of claim 9, wherein the device further comprises:
    ducting for fluidly coupling the first side dryer, second side dryer, bottom dryer, and top dryer to the one or more air blowers; and
    a first water hose for fluidly coupling the water source to the first, second, third, and fourth set of washers.

11. The device of claim 1, wherein the motor is a hydraulic motor.

12. The device of claim 1, wherein the wheeled chassis comprises four rubber wheels configured to contact the floor of the freight container.

13. The device of claim 1, wherein the wheeled chassis further comprises a first set of guide wheels and a second set of guide wheels, wherein a spacing between the first set of guide wheels and the second set of guide wheels is adjustable to allow the first set of guide wheels to contact the first wall and the second set of guide wheels to contact the second wall while the motor propels the chassis longitudinally back and forth along the floor of the freight container.

14. The device of claim 1, wherein the device further comprises one or more ultraviolet (UV) light shrouds configured to emit UV light.

15. The device of claim 14, wherein the one or more UV light shrouds includes two top UV light shrouds, two front UV light shrouds, and two side UV light shrouds.

16. The device of claim 1, wherein the device further comprises:
    a controller;

a stop sensor bar coupled to the controller and extending towards the front of the wheeled chassis and configured to contact the bulkhead of the freight container as the motor propels the chassis longitudinally forward along the floor of the freight container.

17. The device of claim 16, wherein the controller is configured to cause the motor to move the device longitudinally backwards upon the stop sensor bar contacting the bulkhead of the freight container.

18. The device of claim 8, wherein the first set of air knives, the second set of air knives, the third set of air knives, and the fourth set of air knives each comprise a pressurized air plenum defining a continuous slot through which pressurized air is configured to be directed.

19. A method for sanitizing an interior of a freight container with the device of claim 1, the method comprising:
 deploying the device into the interior of the freight container, wherein the interior of the freight container comprises a set of surfaces including a floor, a first wall, second wall, a ceiling, and a bulkhead;
 causing the device to wash the set of surfaces with the first set of washers, the second set of washers, the third set of washers and the fourth set of washers;
 causing the device to dry the set of surfaces with the first side dryer, the second side dryer, and bottom dryer and the top dryer; and
 extracting the device from the interior of the freight container.

20. The method of claim 19, wherein the method further comprises:
 aligning a carriage holding the device with the interior of the freight container prior to deploying the device.

21. The method of claim 19, wherein the method further comprises:
 causing the device to sanitize the set of surfaces using one or more ultraviolet (UV) lamps disposed on the device.

\* \* \* \* \*